| (12) | United States Patent | (10) Patent No.: | US 9,285,561 B2 |
|---|---|---|---|
| | Takakura et al. | (45) Date of Patent: | Mar. 15, 2016 |

(54) OPTICAL FIBER UNIT FOR OPTICAL FIBER SENSOR

(71) Applicant: OMRON Corporation, Kyoto-shi, Kyoto (JP)

(72) Inventors: Takeshi Takakura, Ayabe (JP); Tetsuo Ryugo, Fukuchiyama (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 14/488,670

(22) Filed: Sep. 17, 2014

(65) Prior Publication Data

US 2015/0086167 A1  Mar. 26, 2015

(30) Foreign Application Priority Data

Sep. 24, 2013  (JP) .................................. 2013-197582

(51) Int. Cl.
```
G02B 6/00      (2006.01)
G02B 6/46      (2006.01)
G02B 6/36      (2006.01)
G05B 19/042    (2006.01)
G02B 6/38      (2006.01)
```
(52) U.S. Cl.
  CPC ................ *G02B 6/46* (2013.01); *G02B 6/3624* (2013.01); *G05B 19/0428* (2013.01); *G02B 6/3887* (2013.01)

(58) Field of Classification Search
  None
  See application file for complete search history.

(56) References Cited

U.S. PATENT DOCUMENTS

| 5,080,542 A * | 1/1992 | Sheahan | E04D 3/3601 411/34 |
|---|---|---|---|
| 5,945,665 A * | 8/1999 | Hay | G01B 11/18 250/227.14 |
| 2007/0144267 A1* | 6/2007 | Sato | G01L 5/24 73/761 |
| 2009/0097940 A1* | 4/2009 | Campau | F16B 37/12 411/262 |
| 2015/0086293 A1* | 3/2015 | Takakura | G02B 6/3624 411/337 |

FOREIGN PATENT DOCUMENTS

| JP | 2005-156455 A | 6/2005 |
|---|---|---|
| KR | 2002-0081198 A * | 10/2002 |

\* cited by examiner

*Primary Examiner* — Mike Stahl
(74) *Attorney, Agent, or Firm* — Mots Law, PLLC

(57) ABSTRACT

Disclosed is an optical fiber unit that improves the degree of freedom in setting a jig. The unit includes an optical fiber cable, a shaft, and a head. The shaft includes a peripheral surface having a male thread, and a through-hole in which the optical fiber cable is inserted. The head is shaped as a polygonal prism including a plurality of sides and a bottom. The plurality of sides includes a first side and a second side adjacent to each other. The head includes a space that communicates with the through-hole. The space is exposed at an opening formed in at least the first side and the second side among the plurality of sides. The opening includes a first opening portion formed in the first side, and a second opening portion formed in the second side. The first opening portion and the second opening portion communicate with each other.

9 Claims, 41 Drawing Sheets

FIG. 14A
FIG. 14B
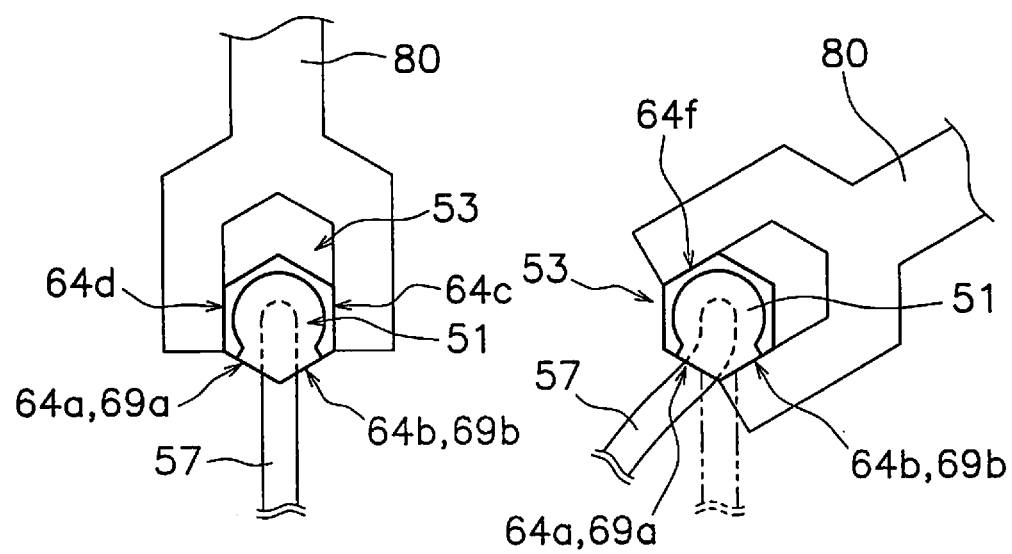
FIG. 14C
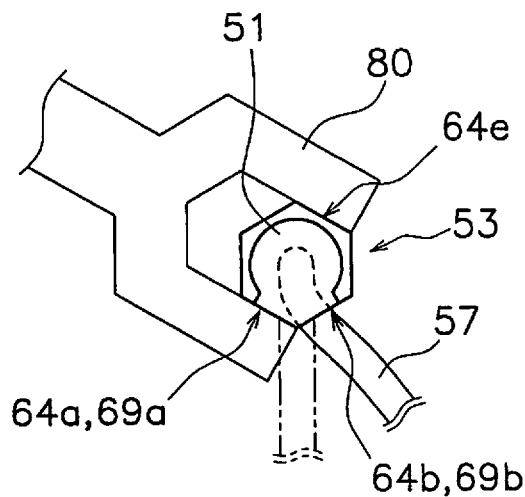

350

450

OPTICAL FIBER UNIT FOR OPTICAL FIBER SENSOR

CROSS REFERENCE TO RELATED APPLICATIONS

This application claims priority to Japanese Patent Application No. 2013-197582 filed on Sep. 24, 2013, the entire contents of which are incorporated by reference herein.

FIELD

The present invention relates to an optical fiber unit for an optical fiber sensor.

BACKGROUND

Japanese Patent Application Publication No. 2005-156455 to TETSUYASU-et-al. is representative of an optical fiber unit in this art (see optical fiber unit 10). FIG. 49 is a perspective view of the described optical fiber unit. FIG. 50 is a perspective exploded view of the optical fiber unit 10.

As shown in FIG. 50, the optical fiber unit 10 described by TETSUYASU-et-al. includes head 11, cover 12, and nut 13. The head 11 includes a cylindrical portion 14 and an optical fiber holder 17. The cylindrical portion 14 includes a through-hole 18, in which an optical fiber cable 15 is inserted. The optical fiber holder 17 includes a groove 22, which communicates with the through-hole 18. The optical fiber holder 17 is shaped in a hexagonal prism defining the groove 22. The optical fiber holder 17 has an opening 23 in one side of its periphery. The optical fiber cable 15 is inserted in the through-hole 18 of the cylindrical portion 14 and in the groove 22 of the optical fiber holder 17, bent at a predetermined curvature and then extends from the opening 23.

SUMMARY

In the optical fiber unit 10 described in Patent Literature 1, the optical fiber cable 15 extends from the opening 23 formed in only one side of the hexagonal prism. This structure limits the method of setting a jig 30, such as a spanner, on the optical fiber holder 17. FIGS. 51A and 51B are diagrams each describing a method of setting the jig 30.

If the jig 30 comes in contact with the optical fiber cable 15, it can damage the optical fiber cable 15. It is thus preferable that the jig 30 grasps the hexagonal prism of the optical fiber holder 17 in a manner to avoid contact with the optical fiber cable 15. More specifically, it is preferable that the jig 30 grasps the facing two sides of the optical fiber holder 17 where the optical fiber cable 15 does not extend. Only two such methods of setting the jig shown in FIGS. 51A and 51B can be used. The degree of freedom in setting the jig is low, and the workability in installing the optical fiber unit 10 is low.

Accordingly, embodiments of the present invention alleviate these problems by providing an optical fiber unit for an optical fiber sensor that improves the degree of freedom in setting a jig on the optical fiber unit.

An optical fiber unit for an optical fiber sensor according to one embodiment includes an optical fiber cable, a shaft, and a head. The shaft, in an embodiment, includes a peripheral surface having a male thread, and a through-hole in which the optical fiber cable is inserted. The head may be shaped in a polygonal prism including a plurality of sides and a bottom. The plurality of sides includes a first side and a second side that are adjacent to each other. The shaft is connected to the bottom of the head. The head includes a space that communicates with the through-hole. The space is exposed at an opening formed in at least the first side and the second side among the plurality of sides. The opening includes a first opening portion formed in the first side, and a second opening portion formed in the second side. The first opening portion and the second opening portion communicate with each other. The opening may be defined by the remaining edges of the sides of the head.

The optical fiber unit for an optical fiber sensor includes the optical fiber cable inserted in the through-hole of the shaft. The optical fiber cable is placed through the space in the head that communicates with the through-hole, and extends from the opening. The opening is formed across at least the first side and the second side of the head. This structure allows the optical fiber cable to be movable across the first side and the second side of the head according to embodiments.

To set the jig on the head, for example, the sides of the head excluding the first side and the second side may be grasped with the jig. In this case, the optical fiber cable, in embodiments, extends from the opening formed across the first side and the second side. Thus, the optical fiber cable does not interfere with the setting of the jig. However, the optical fiber cable extending in a certain direction may interfere with the setting of the jig. In that case, the optical fiber cable can be moved within the range of the first side and the second side of the head to such a position where the optical fiber cable does not interfere with the setting of the jig, according to these embodiments.

Another method to set the jig on the head is to grasp the first side and the side facing the first side with the jig. In this case, the optical fiber cable can be moved to extend from the second side of the head at such a position where the optical fiber cable does not interfere with the setting of the jig. Likewise, another method to set the jig on the head is to grasp the second side and the side facing the second side with the jig. In this case, the optical fiber cable can be moved to extend from the first side at such a position where the optical fiber cable does not interfere with the setting of the jig.

As described above, the optical fiber cable is movable within the range of the opening formed across the first side and the second side of the head. This structure improves the degree of freedom in installing the optical fiber unit for an optical fiber sensor.

In preferable embodiments, the opening has a width greater than a width of the first side or the second side. This structure allows the optical fiber cable to be movable within a wider range.

In preferable embodiments, the first opening portion has a width equal to or greater than a width of the optical fiber cable. This structure allows the optical fiber cable to be accommodated within the range of the first opening portion when the optical fiber cable is moved to extend in the first opening portion. This prevents the optical fiber cable from extending into the second opening portion. In this case, the jig and the optical fiber cable are less likely to come in contact with each other when the jig is set on the second side having the second opening portion.

In preferable embodiments, the second opening portion has a width equal to or greater than a width of the optical fiber cable. This structure allows the optical fiber cable to be accommodated within the range of the second opening portion when the optical fiber cable is moved to extend in the second opening portion. This prevents the optical fiber cable from extending into the first opening portion. In this case, the jig and the optical fiber cable are less likely to come in contact with each other when the jig is set on the first side having the first opening portion.

In preferable embodiments, the optical fiber cable is arranged movable within the space. This structure allows the optical fiber cable to be moved easily.

In preferable embodiments, the optical fiber cable is fixed in the through-hole or at an extension of the through-hole. The optical fiber cable is not fixed at its portions other than the portion in the through-hole and the portion located at an extension of the through-hole. This structure allows the optical fiber cable to be moved easily within the space.

In preferable embodiments, the optical fiber unit for an optical fiber sensor further includes a cover attached to the head to cover the space in a direction of a central axis of the through-hole. The cover includes a first side that is flush with the first side of the head, and a second side that is flush with the second side of the head.

In this structure, the space of the head is covered by the cover. The optical fiber cable is bent in a direction from the through-hole of the shaft toward the opening of the space. The cover allows this bent optical fiber cable to be accommodated in the space in an appropriate manner.

The first side of the cover is flush with the first side of the head. Although no portion of the first side of the head where the first opening portion is formed is grasped with the jig, the side of the head facing the first side and the first side of the cover can be grasped with the jig. Likewise, the second side of the cover is flush with the second side of the head. Although no portion of the second side of the head where the second opening portion is formed is grasped with the jig, the side of the head facing the second side and the second side of the cover can be grasped with the jig.

In preferable embodiments, the space has a width that is greater at a position more away from the through-hole. This structure further increases the movable range of the optical fiber cable.

Many embodiments provide an optical fiber unit for an optical fiber sensor that improves the degree of freedom in setting a jig on the optical fiber unit.

BRIEF DESCRIPTION OF THE DRAWINGS

FIGS. 14A to 14C are diagrams describing the degree of freedom in setting the jig on the optical fiber unit according to the first embodiment.

DETAILED DESCRIPTION

Embodiments will now be described with reference to the drawings. The embodiments described below are mere examples of the claimed invention, and should not limit the technical scope of the invention.

Although embodiments apply to various optical fiber sensors, an optical fiber unit 50 for a transmissive optical fiber sensor will be described first.

First Example

1. Overall Structure of Optical Fiber Unit 50

Figure 1:
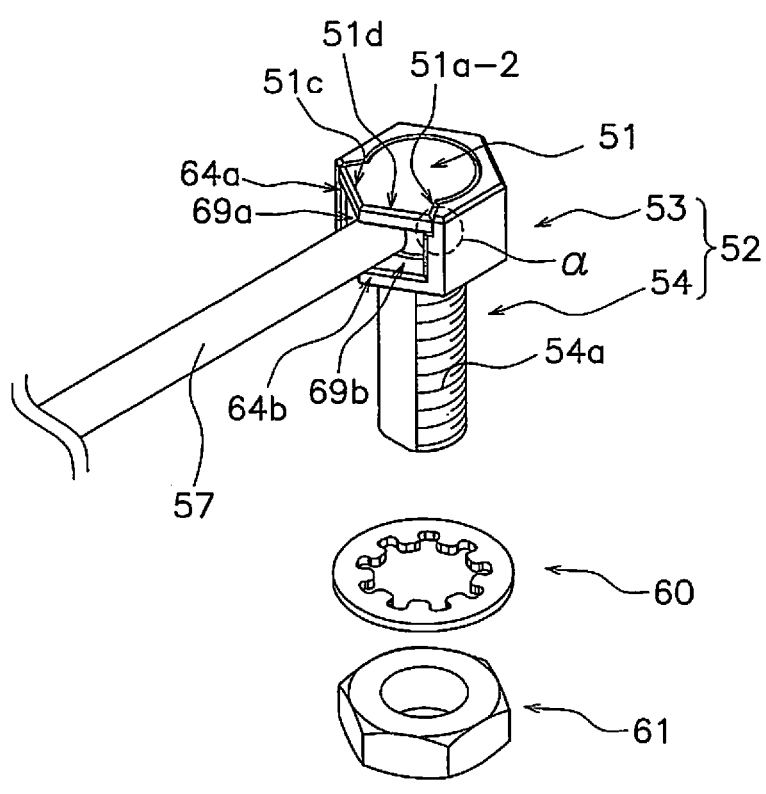
FIG. 1 is a perspective view showing the appearance of an optical fiber unit according to a first embodiment.
Figure 2:
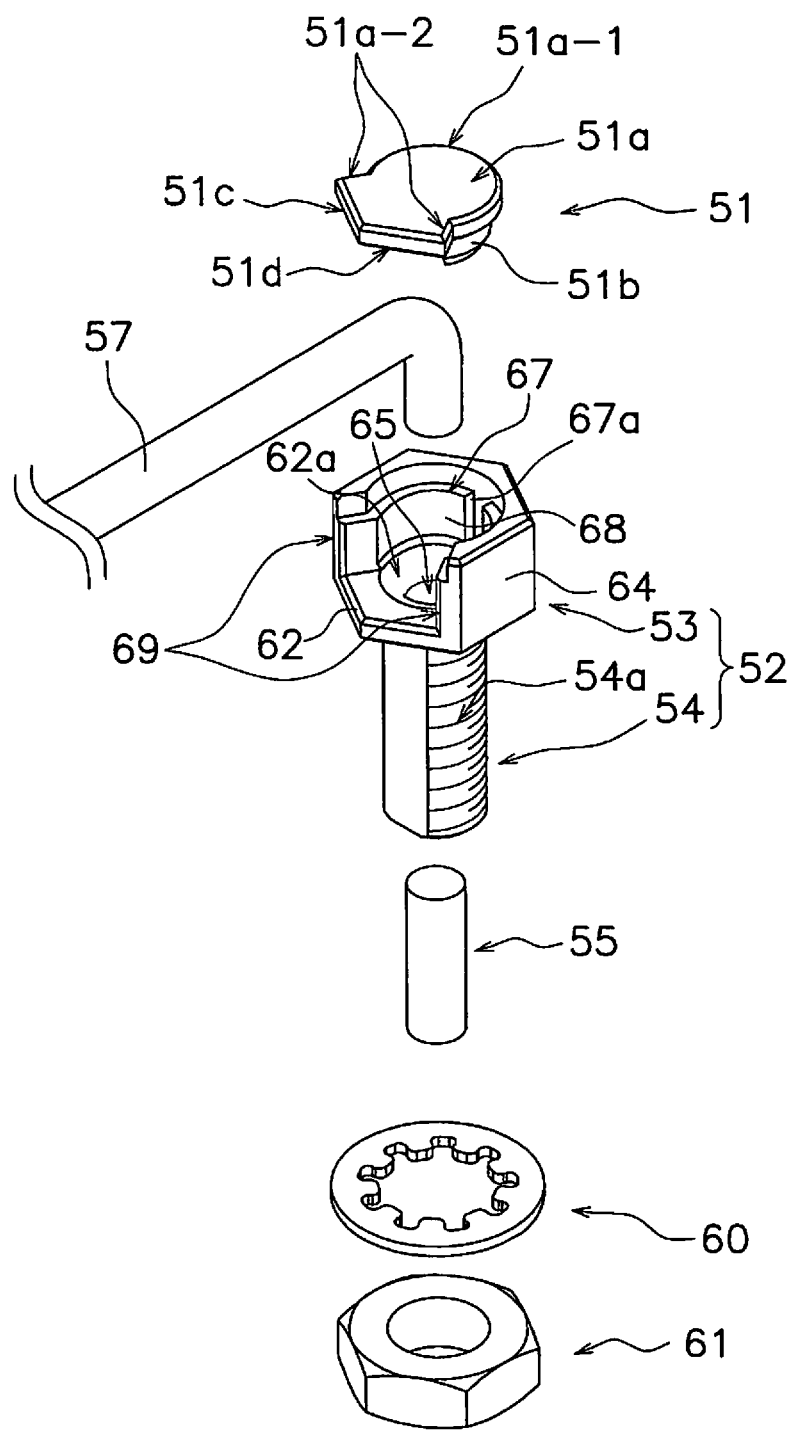
FIG. 2 is an exploded perspective view of the optical fiber unit according to the first embodiment.
Figure 3:
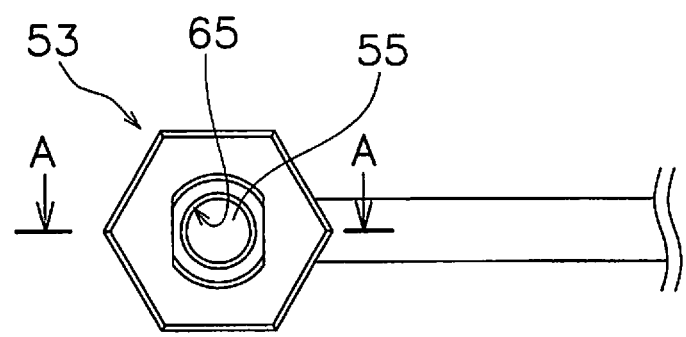
FIG. 3 is an enlarged bottom view of the optical fiber unit according to the first embodiment.
Figure 4:
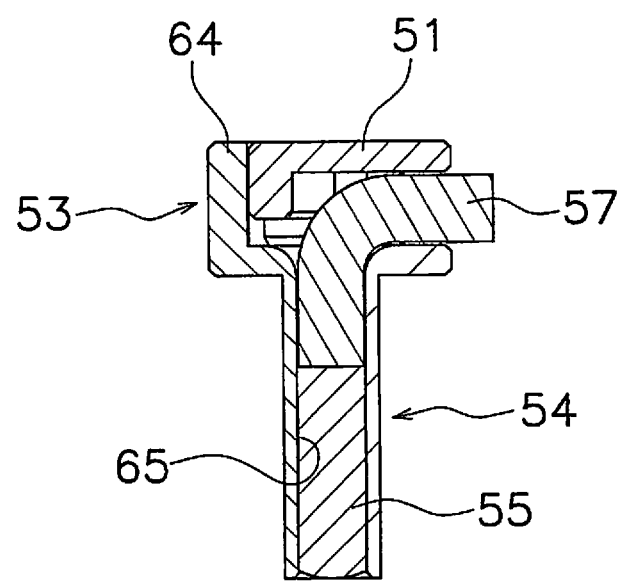
FIG. 4 is a cross-sectional view taken on line A-A in FIG. 3.

FIG. 1 is a perspective view showing the appearance of an optical fiber unit 50 according to a first example used for a transmissive optical fiber sensor. FIG. 2 is an exploded perspective view of the optical fiber unit 50. FIG. 3 is an enlarged bottom view of the optical fiber unit 50. FIG. 4 is a cross-sectional view taken on line A-A in FIG. 3.

The optical fiber unit 50 includes a cover 51, an installation member 52, a lens member 55, a washer 60, a nut 61, and an optical fiber cable 57. In the example described below, a side where the cover 51 exists is the upper side of the optical fiber unit 50, and a side where the nut 61 exists is the lower side of the optical fiber unit 50 as shown in FIGS. 1 and 2 and similar figures. The direction orthogonal to the longitudinal direction of the optical fiber unit 50 is referred to as a planar direction.

The installation member 52 and the nut 61 are made of metal. To maintain a predetermined strength, the installation member 52 and the nut 61 in one example are formed by zinc die casting and are plated with chromium. The installation member 52 is used to install the optical fiber cable 57 onto, for example, a manufacturing line (described later). The installation member 52 includes a shaft 54 and a head 53.

Figure 5:
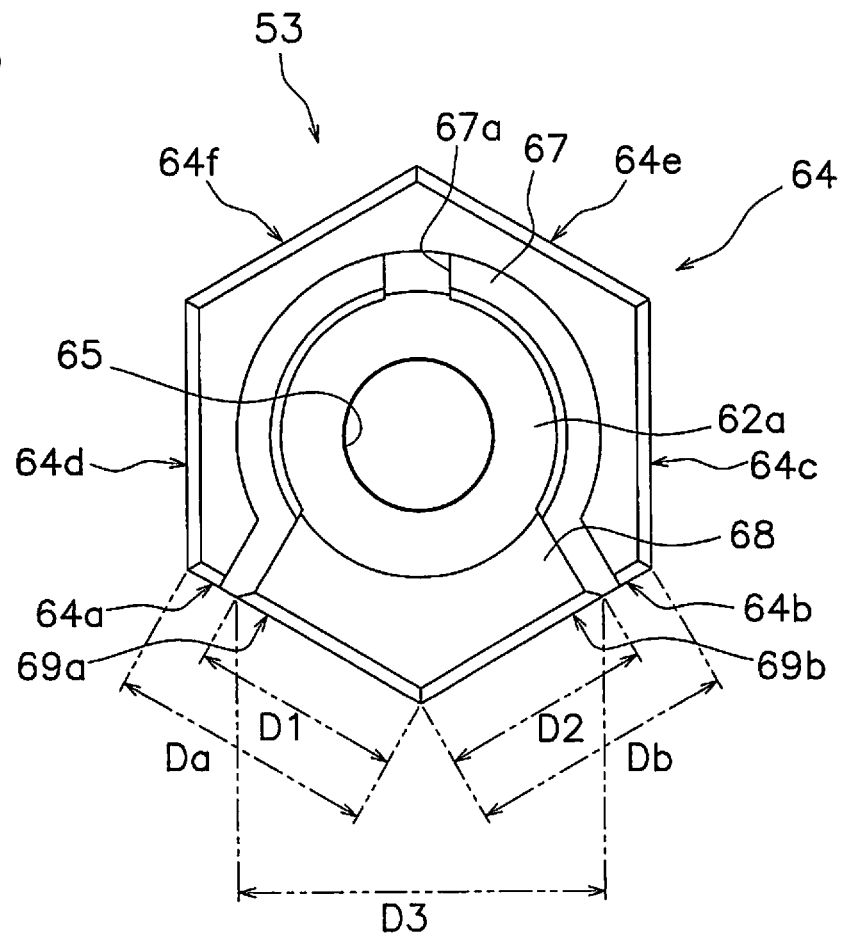
FIG. 5 is a plan view of an installation member according to the first embodiment.
Figure 6:
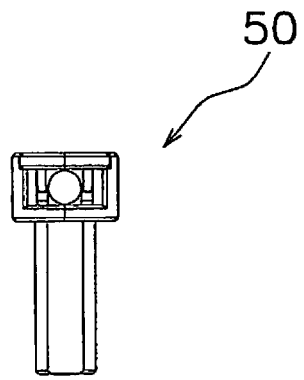
FIG. 6 is a front view of the optical fiber unit according to the first embodiment.
Figure 7:
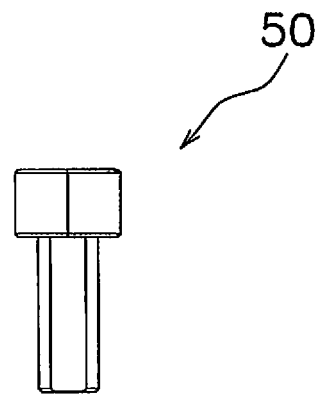
FIG. 7 is a back view of the optical fiber unit according to the first embodiment.
Figure 8:
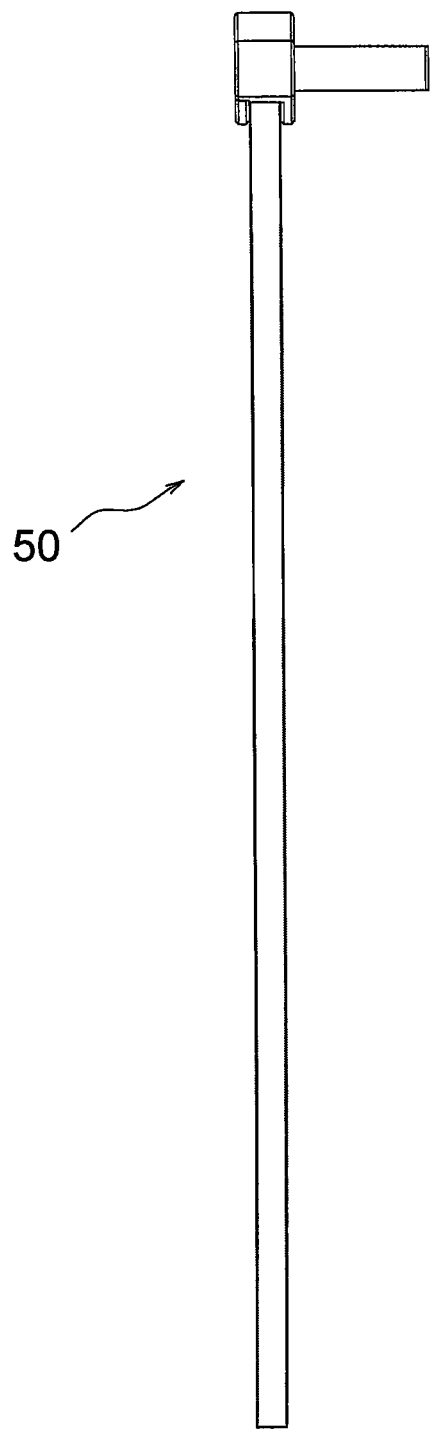
FIG. 8 is a left side view of the optical fiber unit according to the first embodiment.
Figure 9:
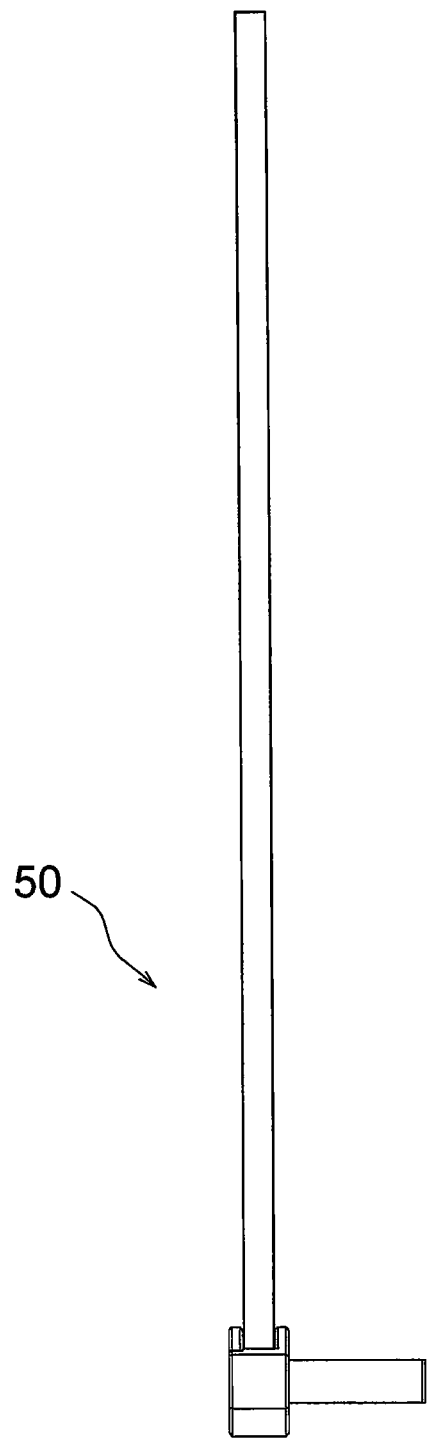
FIG. 9 is a right side view of the optical fiber unit according to the first embodiment.
Figure 10:
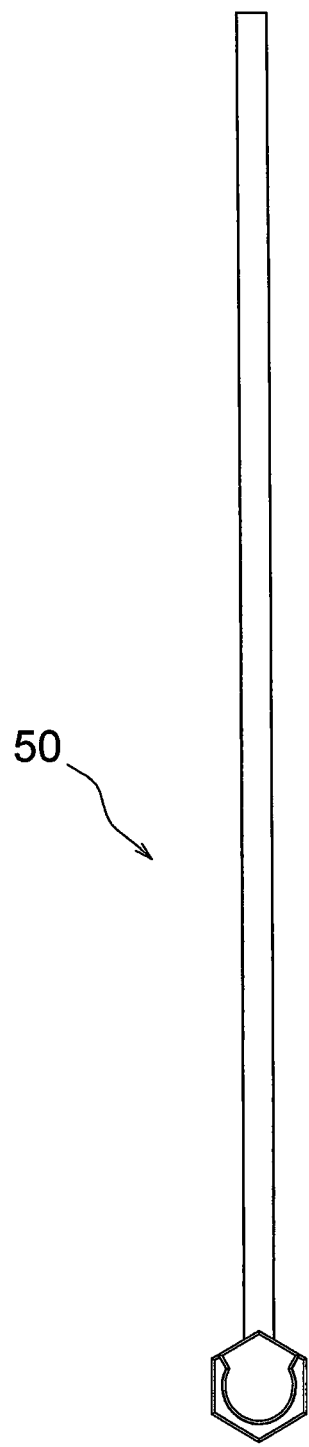
FIG. 10 is a plan view of the optical fiber unit according to the first embodiment.
Figure 11:
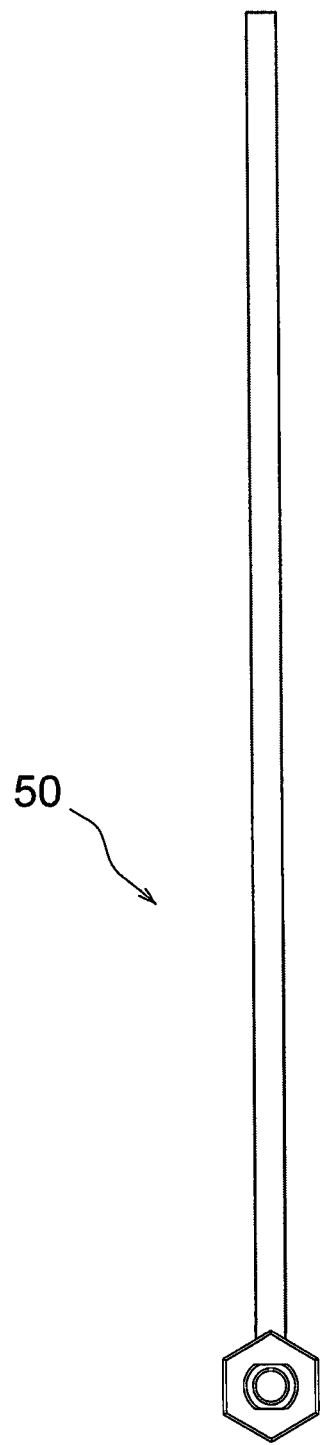
FIG. 11 is a bottom view of the optical fiber unit according to the first embodiment.

FIG. 5 is a plan view of the installation member 52. FIG. 6 is a front view of the optical fiber unit 50. FIG. 7 is a back view of the optical fiber unit 50. FIG. 8 is a left side view of the optical fiber unit 50. FIG. 9 is a right side view of the optical fiber unit 50. FIG. 10 is a plan view of the optical fiber unit 50. FIG. 11 is a bottom view of the optical fiber unit 50.

2. Components of Optical Fiber Unit 50

2-1. Shaft 54

The shaft 54 has an internal through-hole 65, which extends through the shaft 54 in its longitudinal direction. As described below, the optical fiber cable 57 and the lens member 55 are inserted in the through-hole 65. The optical fiber cable 57 is bent at a predetermined curvature as shown in FIG. 2 and is inserted in the through-hole 65.

The shaft 54 has a male thread 54a formed on a portion of its peripheral surface. As shown in FIG. 2, the peripheral surface of the shaft 54 includes a flat portion without the male thread 54a. However, the outer shape of the shaft 54 is not limited to this shape. The shaft 54 may be entirely cylindrical and may include the male thread 54a across its entire circumference.

2-2. Head 53

The head 53 is arranged on top of the shaft 54. The head 53 is integral with the shaft 54. Alternatively, the head 53 may be separate from the shaft 54. The head 53 has a greater outer diameter than the shaft 54, and is shaped in a substantially hexagonal prism. In the present example, the head 53 is shaped in a regular hexagonal prism. The head 53 includes a bottom 62 and an outer wall 64. The bottom 62 comes in contact with the shaft 54. The bottom 62 is shaped in a substantially hexagonal plate. The outer wall 64 protrudes upward from the bottom 62. The bottom 62 and the outer wall 64 define a space 68. The space 68 extends radially outwardly from the through-hole 65 of the shaft 54.

The space 68 communicates with the through-hole 65 of the shaft 54. A communicating portion between the through-hole 65 of the shaft 54 and the space 68 includes a tapered portion 62a, which results from forming a tapered end of the through-hole 65. More specifically, the bottom 62 includes the tapered portion 62a, which communicates with the through-hole 65 of the shaft 54. The tapered portion 62a provides communication between the space 68 and the through-hole 65, and allows the optical fiber cable 57 to be inserted in the through-hole 65 from above the shaft 54.

This structure further allows the optical fiber cable 57 to fix at the through-hole 65 along the curvature of the optical fiber cable 57, allowing more flexibility of the optical fiber cable 57 in the planar direction than the structure without the tapered portion 62a. Further, the space 68 is larger, or specifically wider than the through-hole 65 at positions more away from the through-hole 65, allowing the optical fiber cable 57 placed through the space 68 and extending from an opening 69 (not shown) to be movable within a wider area.

The head 53 includes a plurality of sides. In the present example, the head 53 is shaped in a hexagonal prism. Thus, the head 53 has six sides. More specifically, as shown in FIG. 5, the head 53 includes a first side 64a, a second side 64b, a third side 64c, a fourth side 64d, a fifth side 64e, and a sixth side 64f. The second side 64b is adjacent to the first side 64a. The third side 64c is adjacent to the second side 64b. The fourth side 64d is adjacent to the first side 64a. The fourth side 64d is parallel to the third side 64c. The fifth side 64e is adjacent to the third side 64c. The fifth side 64e is parallel to the first side 64a. The sixth side 64f is adjacent to the fifth side 64e. The sixth side 64f is parallel to the second side 64b.

The outer wall 64 has an opening 69. The opening 69 includes a first opening portion 69a formed in the first side 64a, and a second opening portion 69b formed in the second side 64b. The first opening portion 69a and the second opening portion 69b communicate with each other.

As shown in FIG. 5, the opening 69 has a width D3 greater than a width Da of the first side 64a. The width D3 of the opening 69 is greater than a width Db of the second side 64b. The first opening portion 69a has a width D1 greater than or equal to the diameter of the optical fiber cable 57. The second opening portion 69b has a width D2 greater than or equal to the diameter of the optical fiber cable 57. The width D1 of the first opening portion 69a is equal to the width D2 of the second opening portion 69b. Alternatively, the width D1 of the first opening portion 69a may differ from the width D2 of the second opening portion 69b.

The width of the opening is the length in a direction parallel to the side including the opening as viewed in the direction of the central axis of the through-hole 65. For example, the width D1 of the first opening portion 69a is the length in a direction parallel to the first side 64a as viewed in the direction of the central axis of the through-hole 65. The width D2 of the second opening portion 69b is the length in a direction parallel to the second side 64b as viewed in the direction of the central axis of the through-hole 65. When the opening is formed across a plurality of sides, the width of the opening is the distance between the lateral ends of the openings formed in these sides. For example, the width D3 of the opening 69 is the distance between the lateral end of the first opening portion 69a formed in the first side 64a and the lateral end of the second opening portion 69b formed in the second side 64b. The width of the opening is only required to indicate the range in which the optical fiber cable 57 is movable in each opening, and may be defined in a manner different from the above.

The space 68 defined by the outer wall 64 communicates with the through-hole 65 of the shaft 54, with the tapered portion 62a between the space 68 and the through-hole 65. An attachment wall 67, which protrudes radially inward, is arranged on the inner surface of the outer wall 64. The upper surface of the attachment wall 67 is located lower than the upper surface of the outer wall 64 by the distance corresponding to the thickness of the cover 51. The cover 51 is placed on the attachment wall 67.

2-3. Cover 51

As shown in FIG. 1, the cover 51 is attached to the top of the head 53. The cover 51 is a lid for closing the space 68 of the head 53 in the axial direction of the through-hole 65 of the shaft 54. In detail, the cover 51 is set to close the space 68 from above. The optical fiber cable 57 is bent in a direction from the through-hole 65 of the shaft 54 toward the opening 69 of the space 68. The cover 51 allows this bent optical fiber cable 57 to be accommodated in the space 68 in an appropriate manner.

As shown in FIG. 2, the cover 51 includes a flat plate 51a and a guide 51b. The flat plate 51a is a plate member. The outer shape of the flat plate 51a includes an arc portion 51a-1, joining portions 51a-2, a first side 51c, and a second side 51d. The first side 51c and the second side 51d correspond to the opening 69 of the head 53, and are two straight sides adjacent to each other. The first side 51c and the second side 51d are in conformance with the hexagonal sides of the bottom 62 of the head 53. More specifically, when the cover 51 is placed on the attachment wall 67, the first side 51c and the second side 51d correspond to the sides of the hexagonal bottom 62. In more detail, the first side 51c is flush with the first side 64a, and the second side 51d is flush with the second side 64b as viewed from above. As viewed from above, the first side 51c and the second side 51d are substantially parallel to two of the sides of the hexagonal bottom 62 corresponding to the opening 69.

The arc portion 51a-1 is sized in conformance with the opening formed in the upper surface of the outer wall 64. The joining portions 51a-2 join the arc portion 51a-1 with the first side 51c and with the second side 51d.

The guide 51b protrudes downward in a direction orthogonal to the flat plate 51a, and is shaped to engage with the attachment wall 67 of the head 53. The attachment wall 67 includes a guide groove 67a. When the cover 51 is attached to the head 53, a protrusion (not shown) on the guide 51b is guided along the guide groove 67a. In the cover 51 attached to the head 53, the first side 51c is flush with the first side 64a, and the second side 51d is flush with the second side 64b.

2-4. Lens Member 55

The lens member 55 is a cylindrical lens. The lens member 55 is inserted in the through-hole 65 of the shaft 54, and is fixed to the tip of the optical fiber cable 57. The lens member 55 can focus light from the optical fiber cable 57. The lens member 55 is not an essential component, and can be replaced by an elongated portion of an optical fiber of the optical fiber cable 57.

2-5. Nut 61 and Washer 60

The nut 61 has a female thread, which is screwed with the male thread of the shaft 54. The male thread of the shaft 54 and the female thread of the nut 61 are screwed together to fix the optical fiber unit 50. The washer 60 is arranged between the nut 61 and the head 53. The washer 60 may be eliminated.

3. Assembling and Installing Optical Fiber Unit 50

3-1. Assembling Optical Fiber Unit 50

A representative method for assembling the optical fiber cable 57 will now be described with reference to FIG. 2.

In embodiments, optical fiber cable 57 is coated with a coating material, such as polyester. Of the two distal ends of the optical fiber cable 57, one distal end to be placed into the optical fiber unit 50 is uncovered by removing the coating material.

The optical fiber cable 57 is bent at a predetermined curvature. Adhesive is then applied to or filled in the optical fiber cable 57 and/or the through-hole 65 to fix the optical fiber cable 57 at the through-hole 65 of the shaft 54. The optical fiber cable 57 is only required to extend within the range of the opening 69, and it may extend at any location within this range. It is preferable that the optical fiber cable 57 is fixed such that it can extend through a corner of the hexagonal head 53.

The cover 51 is attached to the head 53 to cover the upper portion of the head 53. The first side 51c and the second side 51d of the cover 51 are located to correspond to the sides of the hexagonal bottom 62. More specifically, the first side 51c is flush with the first side 64a. The second side 51d is flush with the second side 64b. This structure enables easy and secure grasping of the fifth side 64e of the head 53 and the first side 51c with the jig 80, such as a spanner, when the optical fiber unit 50 is installed. Likewise, this structure also enables easy and secure grasping of the sixth side 64f of the head 53 and the second side 51d. As a result, the first side 64a having the first opening portion 69a or the second side 64b having the second opening portion 69b can be grasped with the jig 80.

In an area a indicated by a broken line in FIG. 1, the L-shape joining portion 51a-2 of the cover 51 is engaged with the outer wall 64 to increase the strength of the structure when the jig 80 is set on the first side 51c or the second side 51d of the cover 51.

The lens member 55 is placed in the through-hole 65 of the shaft 54 from below, and is fixed in contact with the tip of the optical fiber cable 57. This completes the assembling processes of the optical fiber unit 50.

The assembling procedure described above is a mere example and a skilled artisan reader readily will understand a wide range of embodiments intended. For example, the assembling procedure is not limited to the procedure described above. In embodiments, the lens member 55 may be inserted in the through-hole 65 before the optical fiber cable 57 is fixed at the through-hole 65. The optical fiber cable 57 may be bent after fixed at the through-hole 65.

In an embodiment, head 53 without the lens member 55 eliminates the need for the process of inserting the lens member 55 in the through-hole 65. In the head 53 without the lens member 55, the optical fiber included in the optical fiber cable 57 is uncovered at positions lower than where the coating material has been removed. The uncovered portion of the optical fiber extends in the through-hole 65.

3-2. Installing Optical Fiber Unit 50

Figure 12:
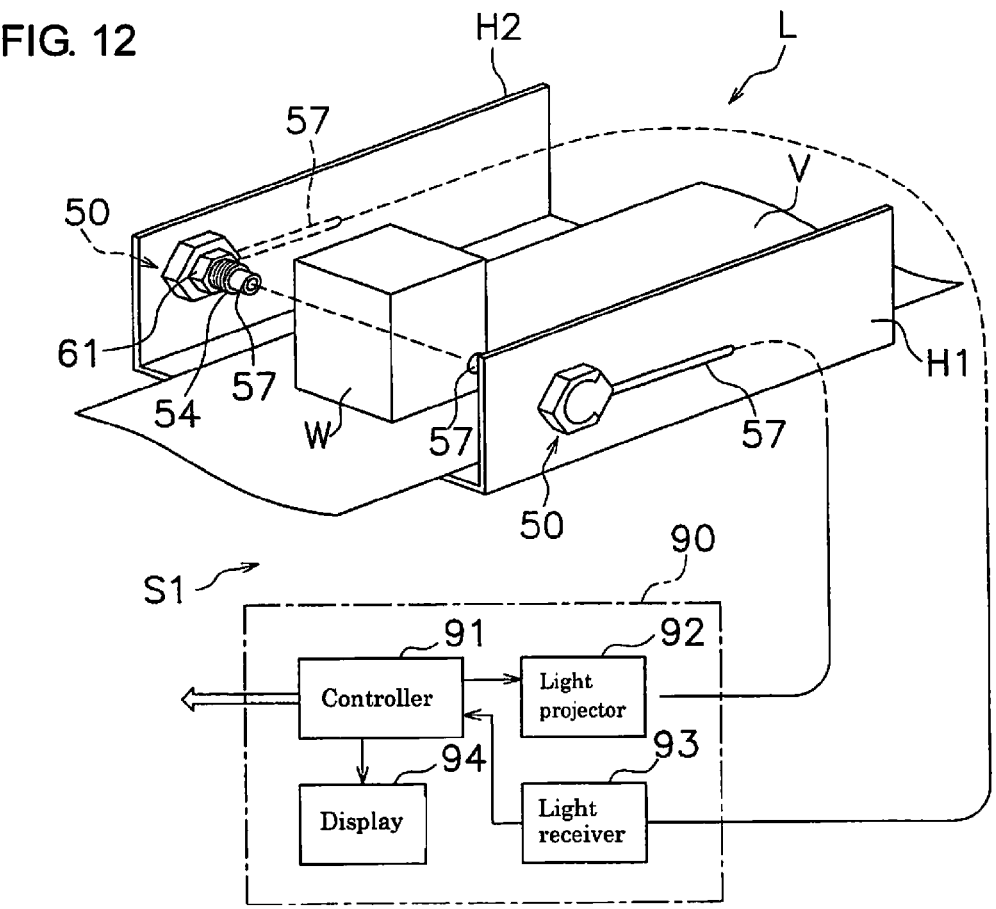
FIG. 12 is a diagram describing the procedure for installing the optical fiber unit according to the first embodiment.

The installation of the optical fiber unit 50 assembled as described above will now be described for an embodiment. FIG. 12 is a diagram describing the procedure for installing the optical fiber unit 50.

As shown in FIG. 12, the optical fiber unit 50 is installed on, for example, a manufacturing line L, on which a workpiece W is transported on a conveyer V. The manufacturing line L includes a side wall H1 and a side wall H2.

A pair of optical fiber units 50 for projecting light and for receiving light is installed. Openings are formed in the side walls H1 and H2 at positions where the optical fiber units 50 for projecting light and receiving light are to be installed. The shaft 54 of each of the optical fiber units 50 for projecting light and receiving light is inserted in the corresponding opening. The nut 61 is then screwed with the male thread 54a of the shaft 54 to fix the optical fiber units 50 for projecting light and for receiving light to the corresponding side walls H1 and H2. In this structure, the optical fiber cable 57 is set along the side walls H1 and H2. The first opening portion 69a and the second opening portion 69b formed in the optical fiber unit 50 allow the optical fiber cable 57 to be movable in a wide range. The optical fiber cable 57 movable in such a wide range improves the degree of freedom in setting the jig 80 on the head 53. In other words, this structure allows the jig 80 to approach the head 53 in many directions to grasp the head 53.

The optical fiber cable 57 extending from the optical fiber unit 50 is connected to the optical sensor unit 90. The optical sensor unit 90 includes a light projector 92 incorporating a light emitting element, a light receiver 93 incorporating a light receiving element, a controller 91, and a display 94. The controller 91 includes various circuits for centrally controlling the optical sensor unit 90. The display 94 displays the detected status of the workpiece W and also displays the settings.

The light projecting optical fiber unit 50, which is fixed to the side wall H1, is connected to the light projector 92. The light receiving optical fiber unit 50, which is fixed to the side wall H2, is connected to the light receiver 93.

As described above, the optical fiber unit 50 is installed to complete the optical fiber sensor S1 including the optical fiber unit 50 and the optical sensor unit 90. The optical fiber sensor S1 detects the status of the workpiece W being transported in accordance with the movement of the conveyer V.

4. Movable Range of Optical Fiber Cable 57

The head 53 includes the opening 69, which is formed across the first side 64a and the second side 64b adjacent to each other. The optical fiber cable 57 extends from the opening 69. The width D3 of the opening 69 is greater than the width Da of the first side 64a and the width Db of the second side 64b as viewed from above. This structure allows the optical cable 57 to be movable in a wider range in the planar direction than the structure in which the optical fiber 57 extends from a single side of the head 53.

As described above, the distal end of the optical fiber cable 57 to be placed into the through-hole 65 of the shaft 54 is uncovered by removing the coating material. Adhesive is then applied to or filled in the optical fiber cable 57 or the through-hole 65 to fix the optical fiber cable 57 at the through-hole 65 of the shaft 54. This structure allows the optical fiber cable 57 to be movable in the planer direction easily than the structure in which the optical fiber cable 57 is fixed entirely at the through-hole 65 and across the head 53 with adhesive.

Figure 13:
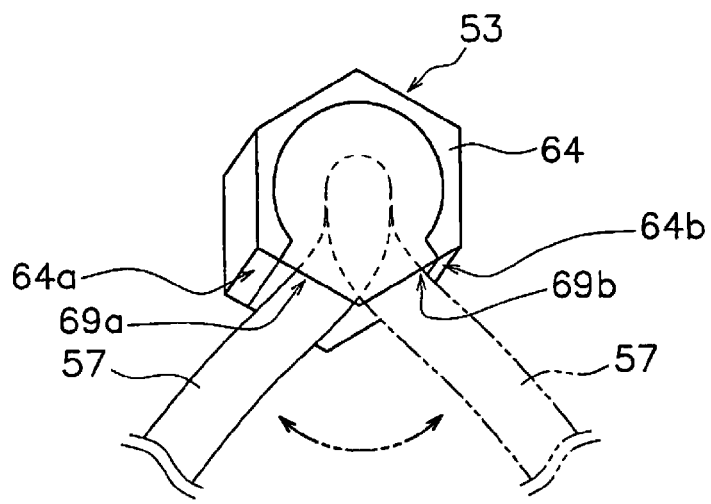
FIG. 13 is a diagram describing the movable range of the optical fiber cable in the optical fiber unit according to the first embodiment.

FIG. 13 is a diagram describing the movable range of the optical fiber cable 57 in the optical fiber unit 50 according to the present example.

In the present example, the opening 69 is formed in the first side 64a and the second side 64b of the head 53. Only the distal end of the optical fiber cable 57 is fixed at the through-hole 65 of the shaft 54. Thus, the optical fiber cable 57 is movable in a wide range in the planar direction in accordance with the size of the opening 69 as shown in FIG. 13.

The width D1 of the first opening portion 69a is equal to or greater than the diameter of the optical fiber cable 57 as viewed from above. Thus, when the optical fiber cable 57 is moved to extend in the first opening portion 69a as indicated by a solid line in FIG. 13, the optical fiber cable 57 is accommodated within the range of the first opening portion 69a, and does not extend in the second opening portion 69b. This structure prevents the jig 80 from coming in contact with and damaging the optical fiber cable 57 when the jig 80 is set on the second side 64b having the second opening portion 69b. Likewise, the width D2 of the second opening portion 69b is equal to or greater than the diameter of the optical fiber cable 57 as viewed from above. Thus, when the optical fiber cable 57 is moved to extend in the second opening portion 69b as indicated by a chain double-dashed line in FIG. 13, the optical fiber cable 57 is accommodated within the range of the second opening portion 69b, and does not extend in the first opening portion 69a. This structure prevents the jig 80 from coming in contact with and damaging the optical fiber cable 57 when the jig 80 is set on the first side 64a having the first opening portion 69a.

The structure described above improves the degree of freedom in setting the jig 80 (described later), and further allows the direction in which the optical fiber cable 57 extends to be changed in a flexible manner, improving the degree of freedom in installing the optical fiber cable 57.

(5) Setting the Jig 80

FIGS. 14A to 14C are diagrams describing the degree of freedom in setting the jig 80 in the present example. In FIGS. 14A to 14C, the optical fiber cable 57 is fixed in a manner to extend through one corner of the hexagonal optical fiber unit 50.

The optical fiber unit 50 of the present example allows the optical fiber cable 57 to be movable in a wide range in accordance with the opening 69.

As shown in FIG. 14A, the jig 80 can be set on two sides of the outer wall 64 of the head 53 excluding the sides having the first opening portion 69a and the second opening portion 69b. More specifically, the jig 80 can be set on the third side 64c and the fourth side 64d. In this case, the optical fiber cable 57 does not interfere with the setting of the jig 80, and thus does not need to be bent.

In the example shown in FIG. 14B, the jig 80 is set on the second side 64b having the second opening portion 69b and the sixth side 64f facing the second side 64b. In this example, the optical fiber cable 57 is bent to extend in the first opening portion 69a on the side where the jig 80 is not set. This prevents the optical fiber cable 57 from coming in contact with the jig 80.

Likewise, in the example shown in FIG. 14C, the jig 80 is set on the first side 64a having the first opening portion 69a and the fifth side 64e facing the first side 64a. In this example, the optical fiber cable 57 is bent to extend in the second opening portion 69b on the side where the jig 80 is not set. This prevents the optical fiber cable 57 from coming in contact with the jig 80.

In the present example, as described above, the jig 80 can be set on the head 53 with the three methods shown in FIGS. 14A to 14C. The optical fiber unit 50 described above thus improves the degree of freedom in setting the jig 80.

6. Modifications

Figure 15:
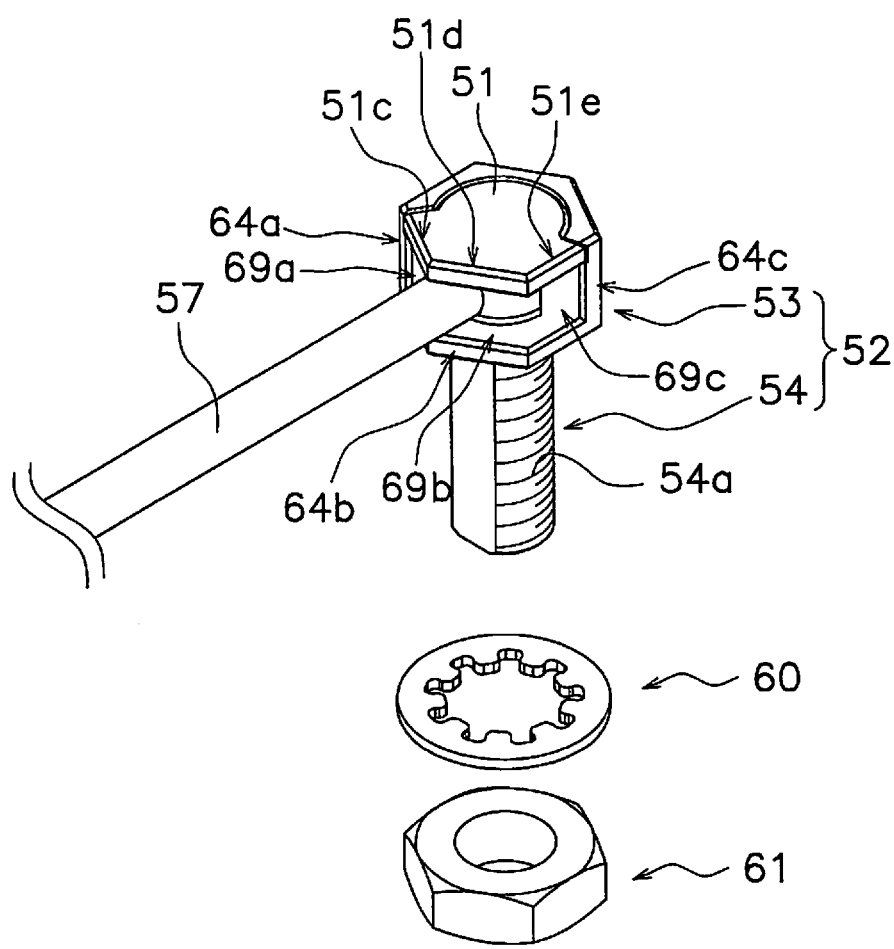
FIG. 15 is a perspective view showing the appearance of the optical fiber unit according to a modification of the first embodiment.

The first example describes the optical fiber unit 50 having two openings, that is, the first opening portion 69a and the second opening portion 69b. The openings may not be limited to the two openings. The optical fiber unit 50 may have three or more openings. FIG. 15 is a perspective view showing the appearance of an optical fiber unit 150 having three openings. The components of this optical fiber unit that are the same as described in the first example will not be further described.

An outer wall 64 of a head 53 extends upright from three adjacent sides of a hexagonal bottom 62. In other words, no outer wall 64 extends from the other three adjacent sides of the hexagonal bottom 62. As shown in FIG. 15, the three adjacent sides where no outer wall 64 is formed constitute an opening 69. More specifically, the opening 69 includes a first opening portion 69a, which is formed in the first side 64a, a second opening portion 69b, which is formed in the second side 64b, and a third opening 69c, which is formed in the third side 64c.

The cover 51 includes a first side 51c, a second side 51d, and a third side 51e. When the cover 51 is attached to the head 53, the first side 51c is flush with the first side 64a of the head 53, the second side 51d is flush with the second side 64b of the head 53, and the third side 51e is flush with the third side 64c of the head 53.

Figure 16:
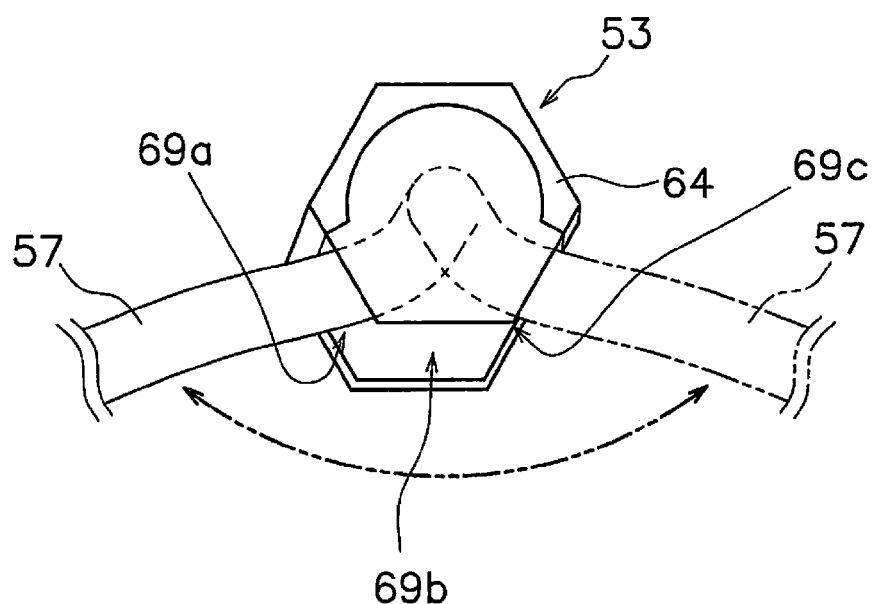
FIG. 16 is a diagram describing the movable range of the optical fiber cable in the optical fiber unit according to the modification of the first embodiment.

FIG. 16 is a diagram describing the movable range of the optical fiber cable 57 in the optical fiber unit 150. The opening 69 is formed across the three adjacent sides of the head 53, which are the first side 64a, the second side 64b, and the third side 64c. Only the distal end of the optical fiber cable 57 is fixed at the through-hole 65 of the shaft 54. Thus, as shown in FIG. 16, the optical fiber cable 57 is movable in a wide range in the planar direction in accordance with the size of the opening 69.

Second Example

Embodiments of an optical fiber unit 250 for a reflective optical fiber sensor will now be described.

1. Overall Structure of Optical Fiber Unit 250

Figure 17:
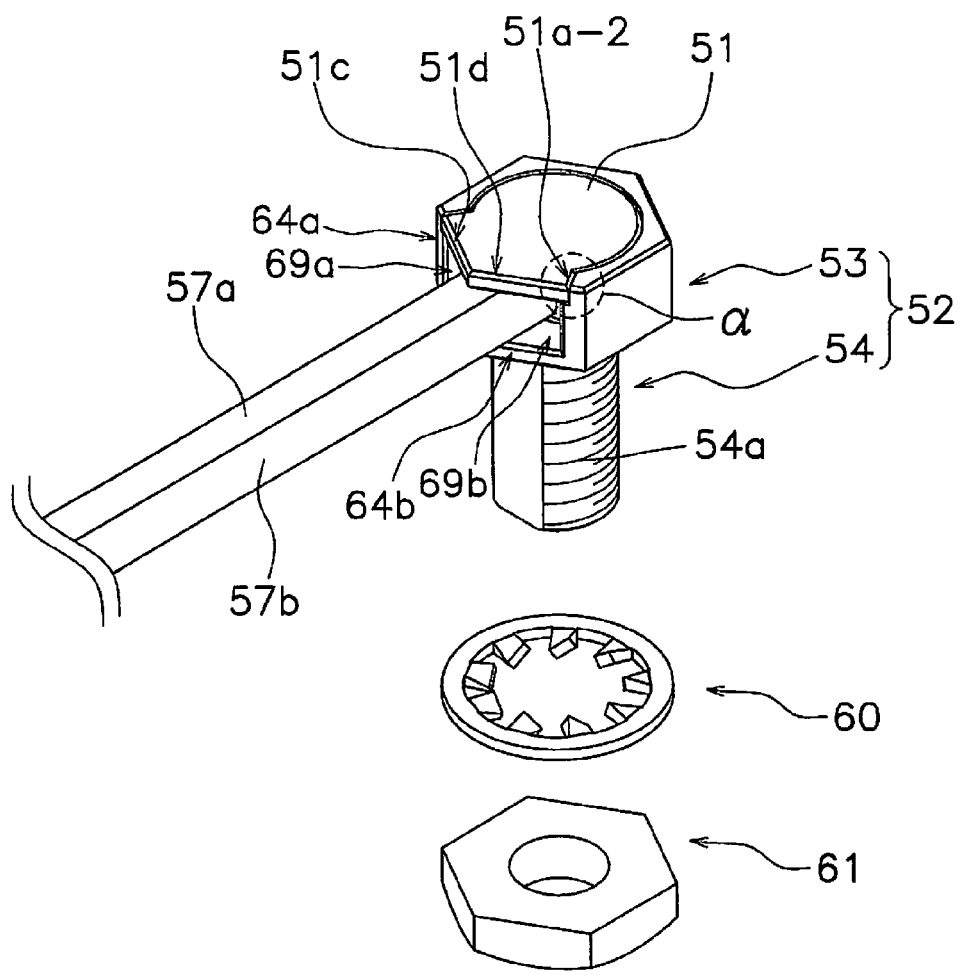
FIG. 17 is a perspective view showing the appearance of an optical fiber unit according to a second embodiment.
Figure 18:
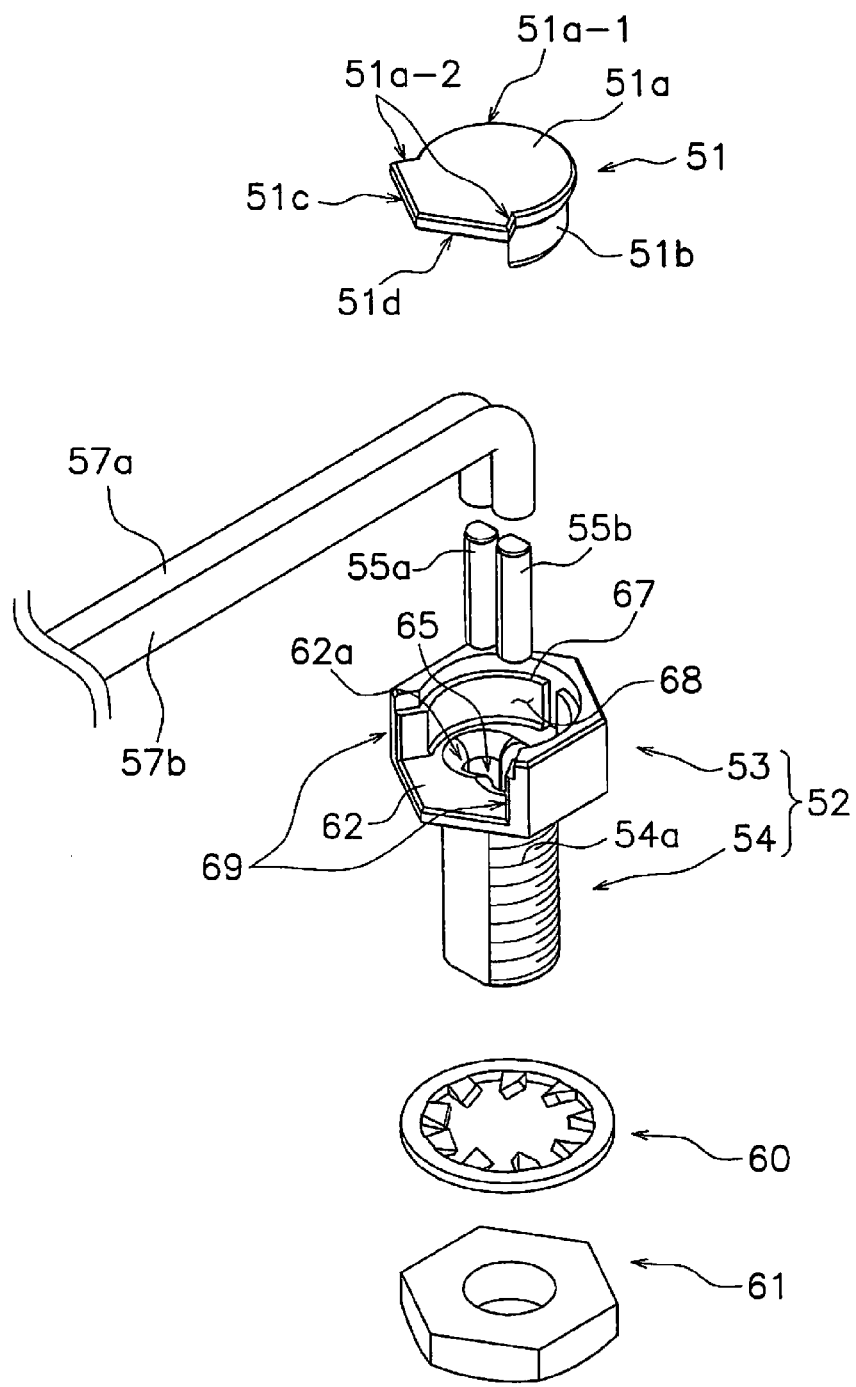
FIG. 18 is an exploded perspective view of the optical fiber unit according to the second embodiment.
Figure 19:
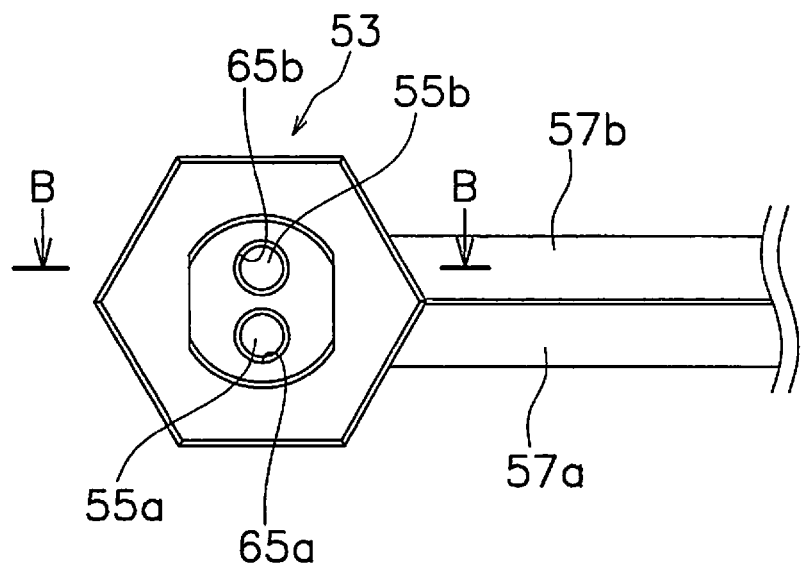
FIG. 19 is an enlarged bottom view of the optical fiber unit according to the second embodiment.
Figure 20:
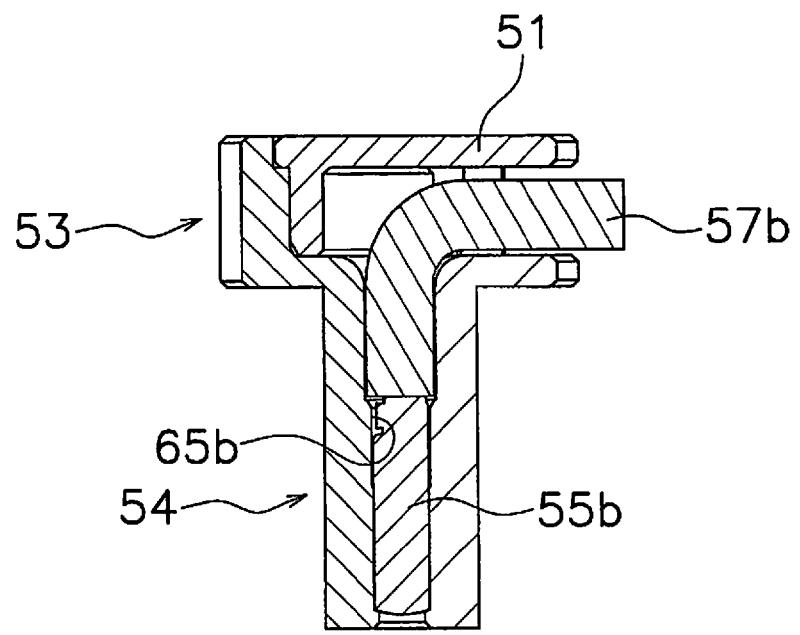
FIG. 20 is a cross-sectional view taken on line B-B in FIG. 19.
Figure 21:
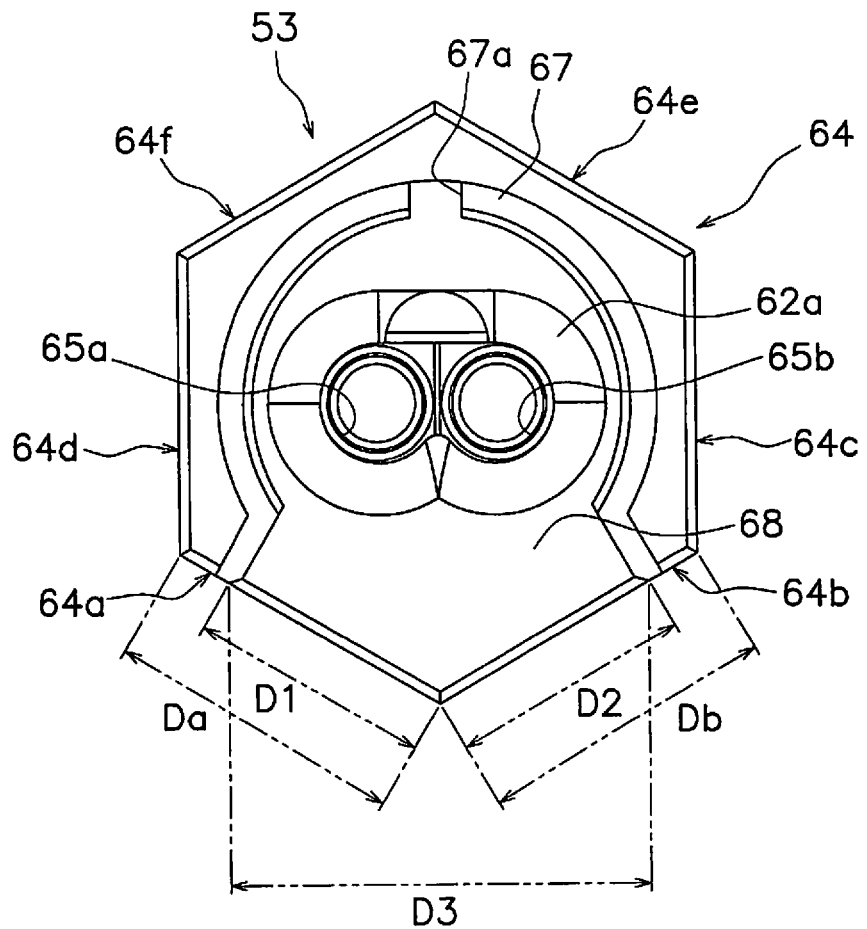
FIG. 21 is a plan view of the optical fiber unit according to the second embodiment from which the cover has been removed.

FIG. 17 is a perspective view showing the appearance of the optical fiber unit 250 for a reflective optical fiber sensor according to a second example. FIG. 18 is an exploded perspective view of the optical fiber unit 250. FIG. 19 is an enlarged bottom view of the optical fiber unit 250. FIG. 20 is a cross-sectional view taken on line B-B in FIG. 19. FIG. 21 is a plan view of the optical fiber unit 250 from which the cover 51 has been removed.

Figure 22:
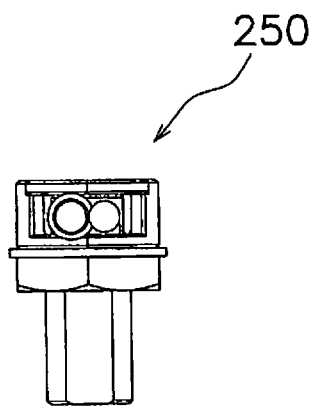
FIG. 22 is a front view of the optical fiber unit according to the second embodiment.
Figure 23:
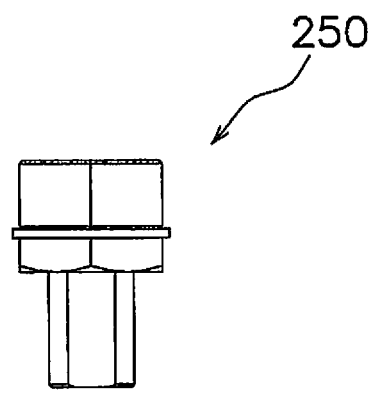
FIG. 23 is a back view of the optical fiber unit according to the second embodiment.
Figure 24:
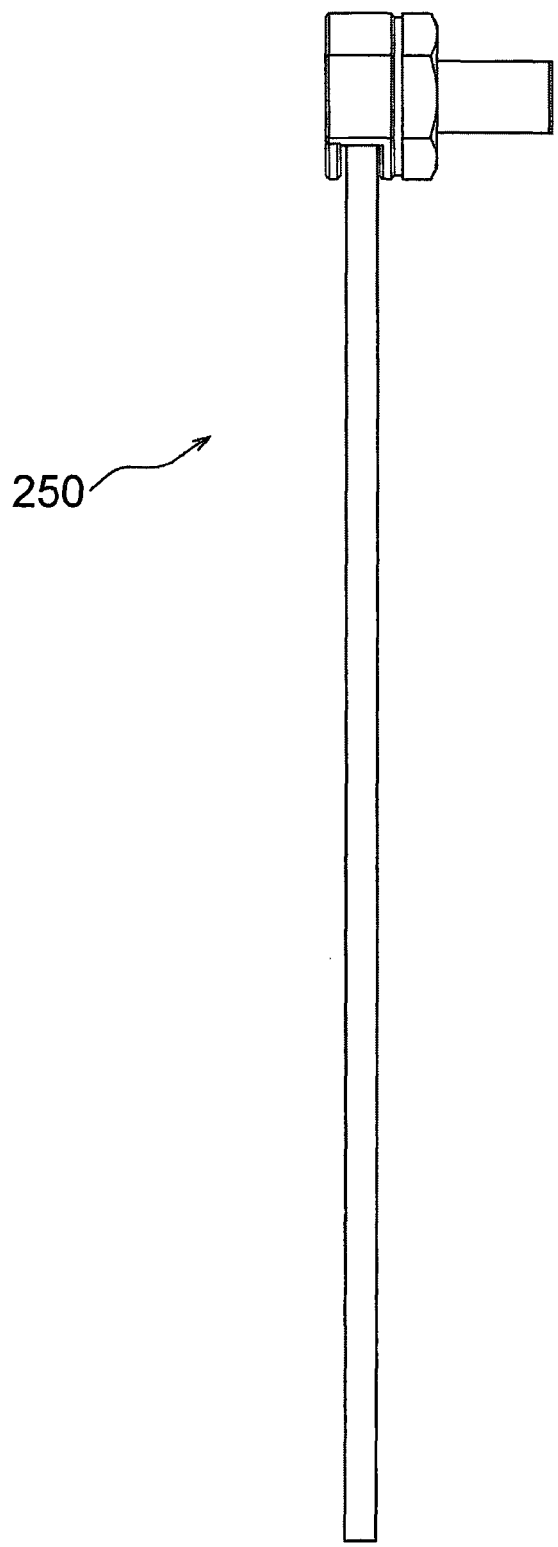
FIG. 24 is a left side view of the optical fiber unit according to the second embodiment.
Figure 25:
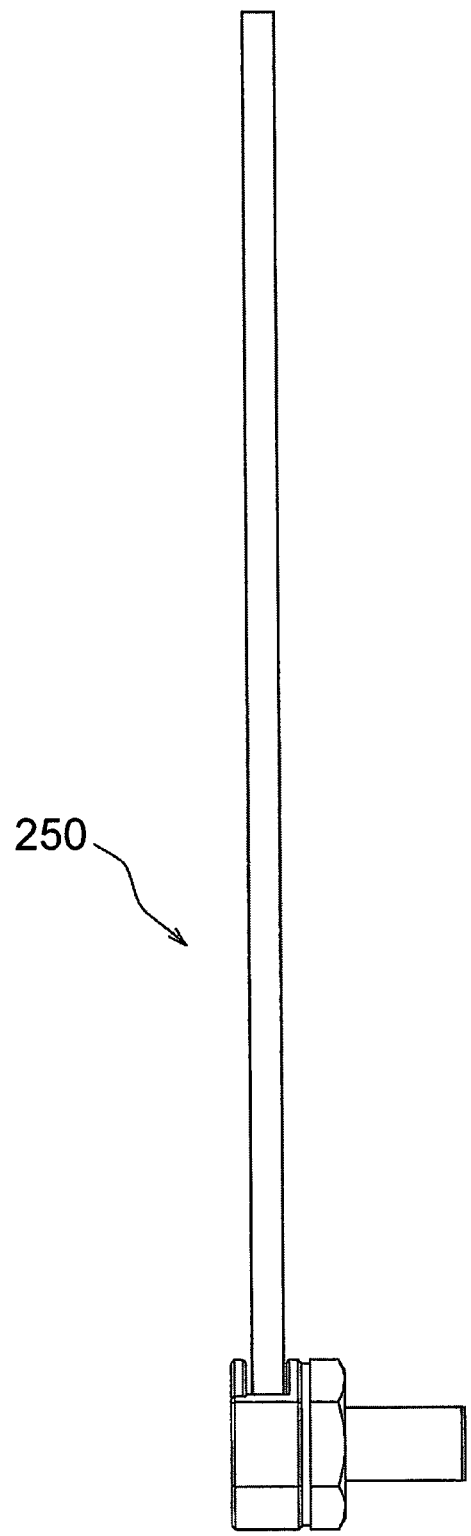
FIG. 25 is a right side view of the optical fiber unit according to the second embodiment.
Figure 26:
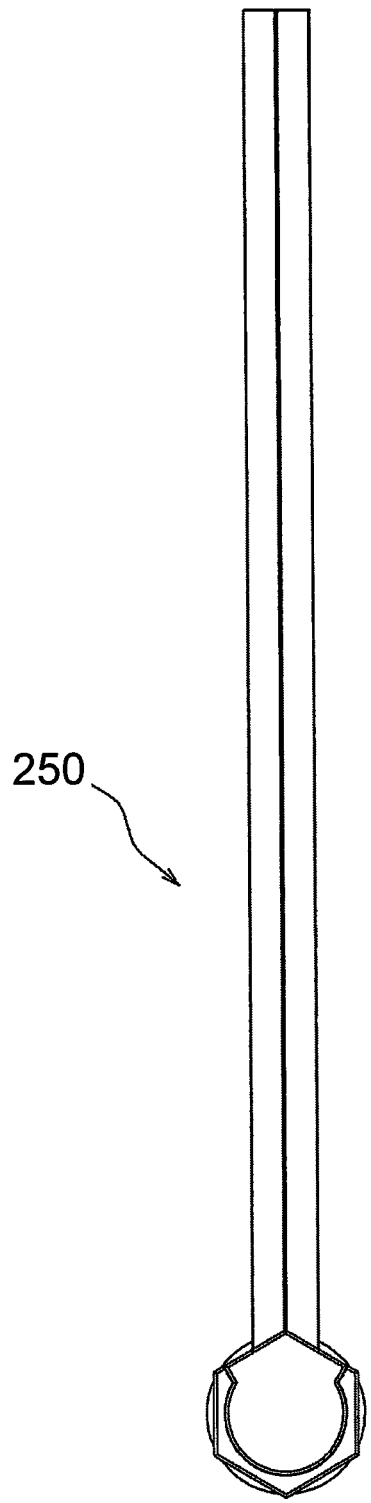
FIG. 26 is a plan view of the optical fiber unit according to the second embodiment.
Figure 27:
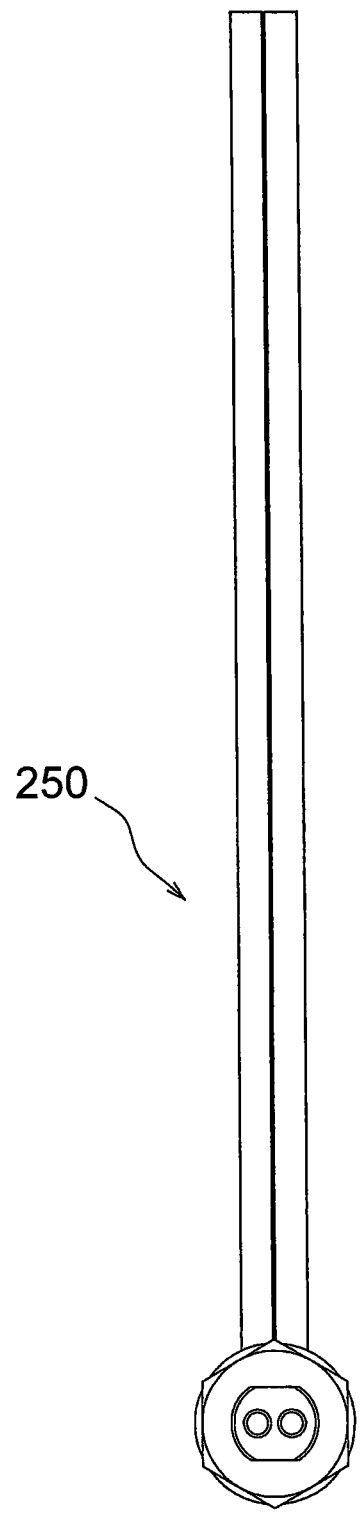
FIG. 27 is a bottom view of the optical fiber unit according to the second embodiment.

FIG. 22 is a front view of the optical fiber unit 250. FIG. 23 is a back view of the optical fiber unit 250. FIG. 24 is a left side view of the optical fiber unit 250. FIG. 25 is a right side view of the optical fiber unit 250. FIG. 26 is a plan view of the optical fiber unit 250. FIG. 27 is a bottom view of the optical fiber unit 250.

The reflective optical fiber unit 250 according to embodiments of the second example will now be described. The reflective optical fiber unit 250 according to the second example differs from the transmissive optical fiber unit 50 according to the first example in that it includes two optical fiber cables 57a and 57b and two lens members 55a and 55b. To accommodate the two optical fiber cables 57a and 57b and the two lens members 55a and 55b, the reflective optical fiber unit 250 includes a cover 51, a head 53, a shaft 54, a washer 60, and a nut 61 that are all larger than the corresponding components of the optical fiber unit 50 of the first example. The other components are substantially the same as described in the first example, and the components that are the same as the components of the transmissive optical fiber unit 50 in the first example will be described briefly or will not be described.

The reflective optical fiber unit 250 according to the second example includes the two optical fiber cables 57a and 57b, one of which is intended for projecting light, and the other is for receiving light. Each of the optical fiber cables 57a and 57b is the same as the optical fiber cable 57 described in the first example.

The optical fiber unit 250 includes the cover 51, the head 53, the shaft 54, the lens members 55, and the nut 61. The two lens members 55a and 55b are respectively arranged in correspondence with the two optical fiber cables 57a and 57b. The lens members 55a and 55b are fixed in correspondence with the two optical fiber cables 57a and 57b.

2. Components of Optical Fiber Unit 250

2-1. Shaft 54

The shaft 54 has an internal through-hole 65, which extends through the shaft 54 in its longitudinal direction. The through-hole 65 is sized to accommodate the two optical fiber cables 57a and 57b, which are inserted through the through-hole. As shown in FIGS. 19 and 21, the through-hole 65 includes a first through-hole 65a and a second through-hole 65b. The first through-hole 65a receives the optical fiber cable 57a. The second through-hole 65b receives the optical fiber cable 57b. In the second example, the two optical fiber cables 57a and 57b are arranged adjacent to each other in the planar direction and are bound together. The optical fiber cable 57a and the optical fiber cable 57b separate in the vicinity of the through-hole 65. The first through-hole 65a and the second through-hole 65b may be separate from each other or may communicate with each other.

2-2. Head 53

The head 53, which is arranged on top of the shaft 54, includes a bottom 62 and an outer wall 64. The bottom 62 and the outer wall 64 define a space 68. In the second example, the space 68 has a circular portion having a diameter large enough to allow the two optical fiber cables 57a and 57b to be inserted through it. The space 68 communicates with the through-hole 65 of the shaft 54. The through-hole 65 may include a tapered portion 62a, which results from forming a tapered end of the through-hole 65 in the communicating portion between the through-hole 65 of the shaft 54 and the space 68.

As shown in FIGS. 17 and 18, the outer wall 64 is not formed on two adjacent sides of the hexagonal bottom 62, and instead an opening 69 is formed in the two adjacent sides. More specifically, the opening 69 includes a first opening portion 69a and a second opening portion 69b, which are adjacent to each other. The first opening portion 69a is formed in the first side 64a. The second opening portion 69b is formed in the second side 64b.

An attachment wall 67, which protrudes radially inward, is arranged on the inner surface of the outer wall 64. The upper surface of the attachment wall 67 is located lower than the upper surface of the outer wall 64 by the distance corresponding to the thickness of the cover 51. The attachment wall 67 shown in FIG. 18 is arranged across the entire circumference of the outer wall 64.

2-3. Cover 51

The cover 51 is attached to the top of the head 53. The cover 51 includes a flat plate 51a and a guide 51b. The outer shape of the flat plate 51a includes an arc portion 51a-1, joining portions 51a-2, a first side 51c, and a second side 51d. The first side 51c and the second side 51d correspond to the opening 69 of the head 53, and are two straight sides adjacent to each other. When the cover 51 is placed on the attachment wall 67, the first side 51c is flush with the first side 64a of the head 53, and the second side 51d is flush with the second side 64b of the head 53 as viewed from above. The guide 51b is engaged along the attachment wall 67 of the head 53.

2-4. Lens Members 55a and 55b

The two optical fiber cables 57a and 57b have the corresponding lens members 55a and 55b. The lens member 55a is fixed to the tip of the optical fiber cable 57a. The lens member 55b is fixed to the tip of the optical fiber cable 57b.

2-5. Nut 61 and Washer 60

The nut 61 is screwed with the male thread of the shaft 54 to fix the optical fiber unit 250. The washer 60 is arranged between the nut 61 and the head 53.

The washer 60 may be eliminated.

3. Assembling and Installing Optical Fiber Unit 250

3-1. Assembling Optical Fiber Unit 250

A method for assembling the optical fiber cables 57a and 57b will now be described with reference to FIG. 18. The method is substantially the same as the assembling method of the first example described with reference to FIG. 2, and will be described briefly.

Of the two distal ends of each of the optical fiber cables 57a and 57b, one distal end of each optical fiber cable to be placed into the optical fiber unit 250 is uncovered by removing the coating material.

The optical fiber cables 57a and 57b are bent at a predetermined curvature. Adhesive is then applied to or filled in the optical fiber cables 57a and 57b and/or the through-hole 65 to fix the optical fiber cables 57a and 57b at the through-hole 65 of the shaft 54.

The optical fiber cables 57a and 57b are only required to extend within the range of the opening 69, and they may extend at any locations within this range. It is preferable that the two optical fiber cables 57a and 57b are fixed such that the optical cables can extend through a corner of the hexagonal head 53. For example, the two optical fiber cables 57a and 57b extend such that the contacting portion between the optical fiber cables 57a and 57b corresponds to the corner of the hexagonal head 53 as shown in FIG. 17.

The guide 51b of the cover 51 is placed along the attachment wall 67 of the head 53. As a result, the cover 51 is attached to the head 53.

Subsequently, the lens members 55a and 55b are placed into the through-hole 65 of the shaft 54, and are fixed in contact with the tips of the corresponding optical fiber cables 57a and 57b. This completes the assembling processes of the optical fiber unit 250.

3-2. Installing Optical Fiber Unit 250

Figure 28:
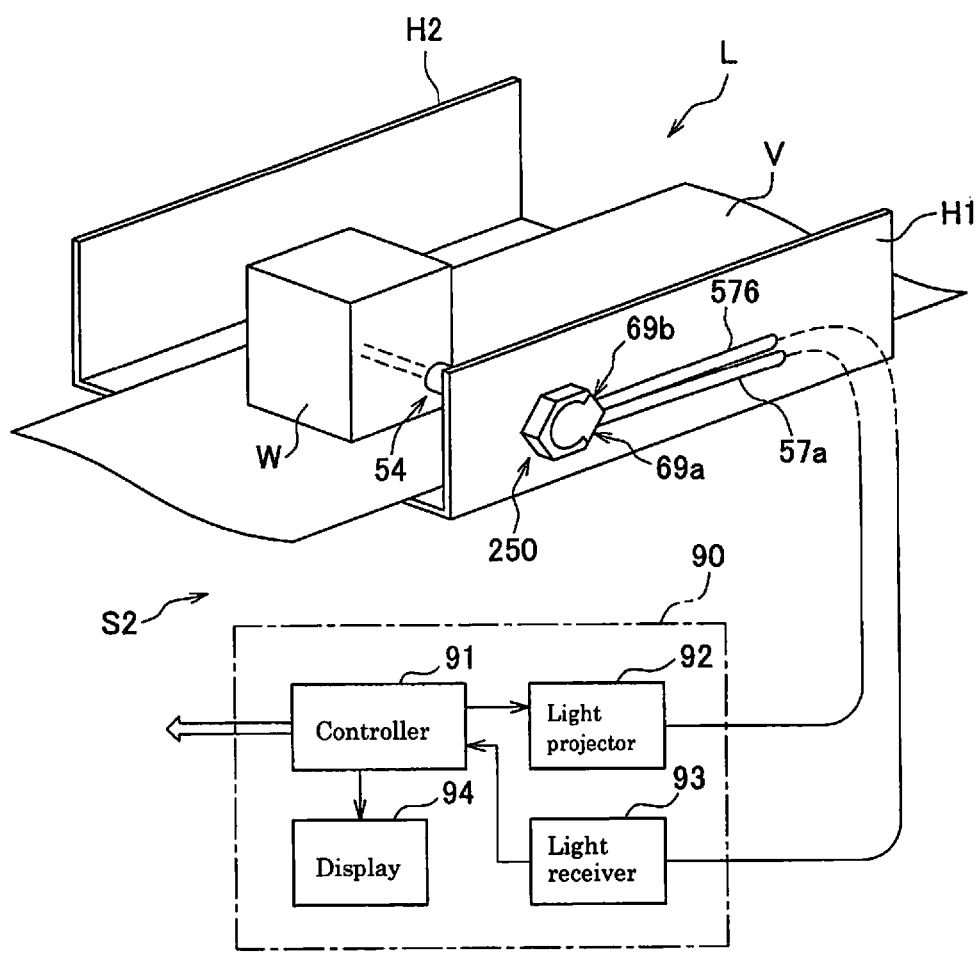
FIG. 28 is a diagram describing the procedure for installing the optical fiber unit according to the second embodiment.

The installation of the optical fiber unit 250 assembled as described above will now be described. FIG. 28 is a diagram describing the procedure for installing the optical fiber unit 250.

As shown in FIG. 28, the optical fiber unit 250 is installed on, for example, a manufacturing line L on which a workpiece W is transported on a conveyer V. The manufacturing line L includes a side wall H1 and a side wall H2.

An opening is formed at a predetermined position where the optical fiber unit 250 is to be installed. The shaft 54 of the optical fiber unit 250 is inserted in the opening. The nut 61 is then screwed with the male thread 54a of the shaft 54 to fix the reflective optical fiber unit 250 to the side wall H1. The first opening portion 69a and the second opening portion 69b of the optical fiber unit 250 allow the two optical fiber cables 57a and 57b to be movable in a wide range. The optical fiber cables 57a and 57b movable in such a wide range improve the degree of freedom in setting the jig 80.

The optical fiber cables 57a and 57b extending from the optical fiber unit 250 are connected to the optical sensor unit 90. For example, the optical fiber cable 57a for projecting light is connected to the light projector 92. The optical fiber cable 57b for receiving light is connected to the light receiver 93.

As described above, the optical fiber unit 250 is installed to complete the optical fiber sensor S2 including the optical fiber unit 250 and the optical sensor unit 90. The optical fiber sensor S2 detects the status of the workpiece W being transported in accordance with the movement of the conveyer V.

4. Characteristics of Optical Fiber Unit 250 of the Present Example

The head 53 of the optical fiber unit 250 according to the second example includes the opening 69, which is formed across the first side 64a and the second side 64b adjacent to each other, in the same manner as in the first example. The optical fiber cables 57a and 57b extend from the opening 69. The width D3 of the opening 69 is greater than the width of the two optical cables 57a and 57b that are bound together. Thus, the optical fiber cables 57a and 57b are movable in a wide range in the planar direction in accordance with the size of the opening 69.

As described above, the optical fiber cables 57a and 57b are fixed at the through-hole 65 of the shaft 54. This structure allows the optical fiber cables 57a and 57b to be movable in the planer direction easily than the structure in which the optical cables 57a and 57b are fixed entirely at the through-hole 65 and across the head 53.

The movable range of the optical fiber cables 57a and 57b in the present example is the same as described in the first example with reference to FIG. 13, and will not be described. The degree of freedom in setting the jig 80 in the present example is also the same as described in the first example with reference to FIGS. 14A to 14C, and will not be described.

5. Modifications

The invention is applicable to other optical fiber sensors including a coaxial reflective optical fiber sensor and a diffusive-reflective optical fiber sensor. The optical fiber units 350 and 450 used for such optical fiber sensors will now be described briefly.

5-1. Coaxial Reflective Optical Fiber Unit 350

A coaxial reflective optical fiber unit 350 according to a first modification will now be described.

The coaxial reflective optical fiber unit 350 according to a first modification of the second example differs from the reflective optical fiber unit 250 according to the second example in the components described below. The other components that are the same as in the second example will not be described.

Figure 29:
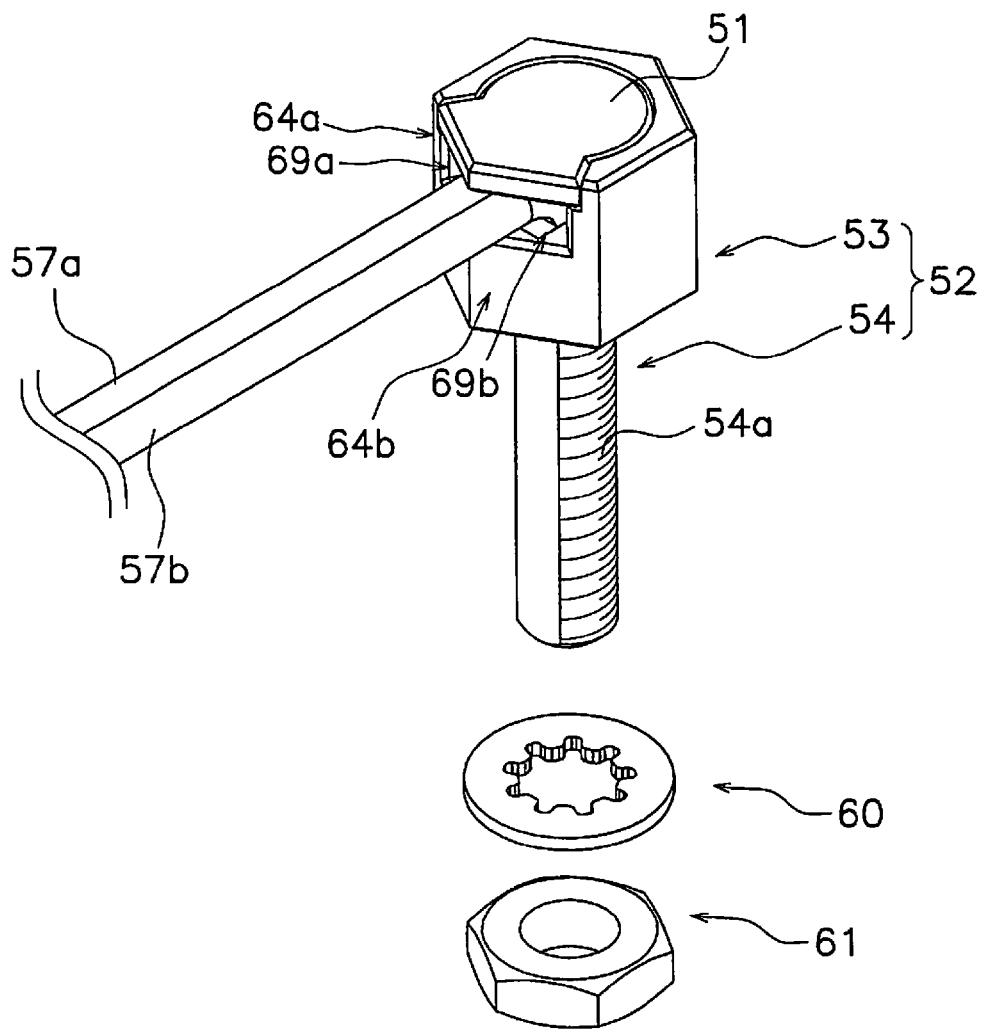
FIG. 29 is a perspective view showing the appearance of a coaxial reflective optical fiber unit according to a first modification of the second embodiment.
Figure 30:
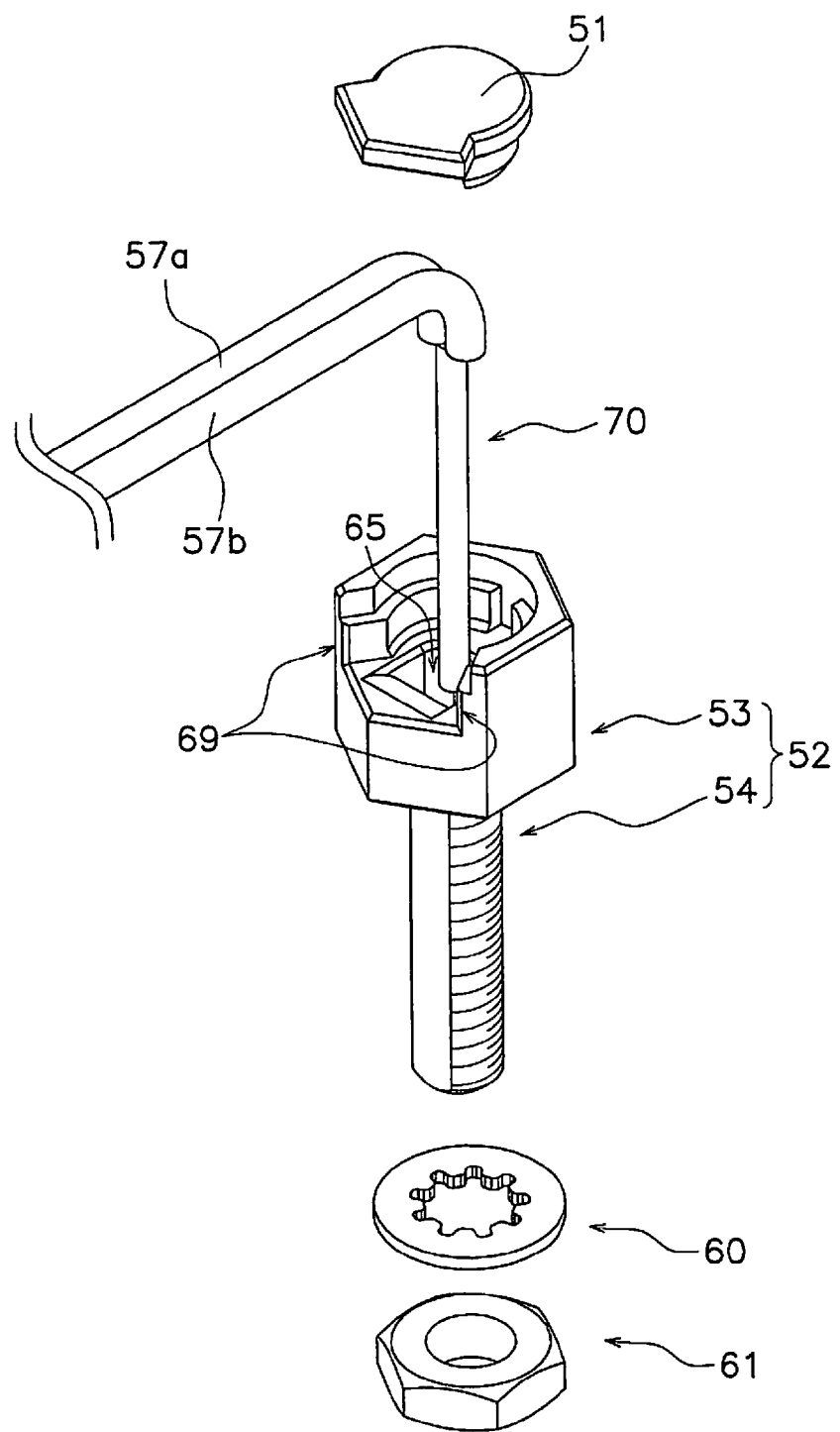
FIG. 30 is an exploded perspective view of the coaxial reflective optical fiber unit according to the first modification of the second embodiment.
Figure 31:
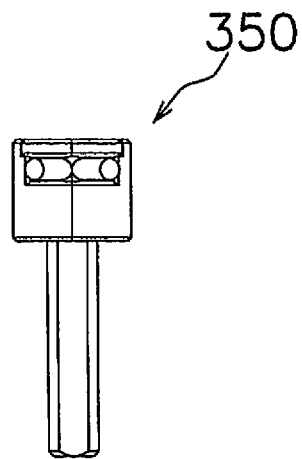
FIG. 31 is a front view of the optical fiber unit according to a first modification of the second embodiment.
Figure 32:
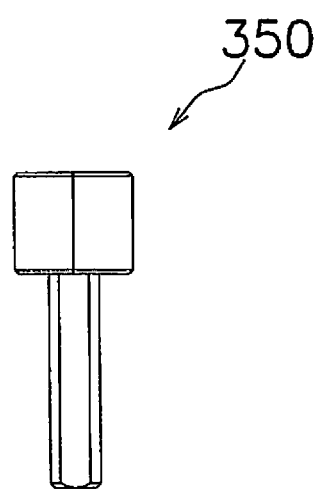
FIG. 32 is a back view of the optical fiber unit according to the first modification of the second embodiment.
Figure 33:
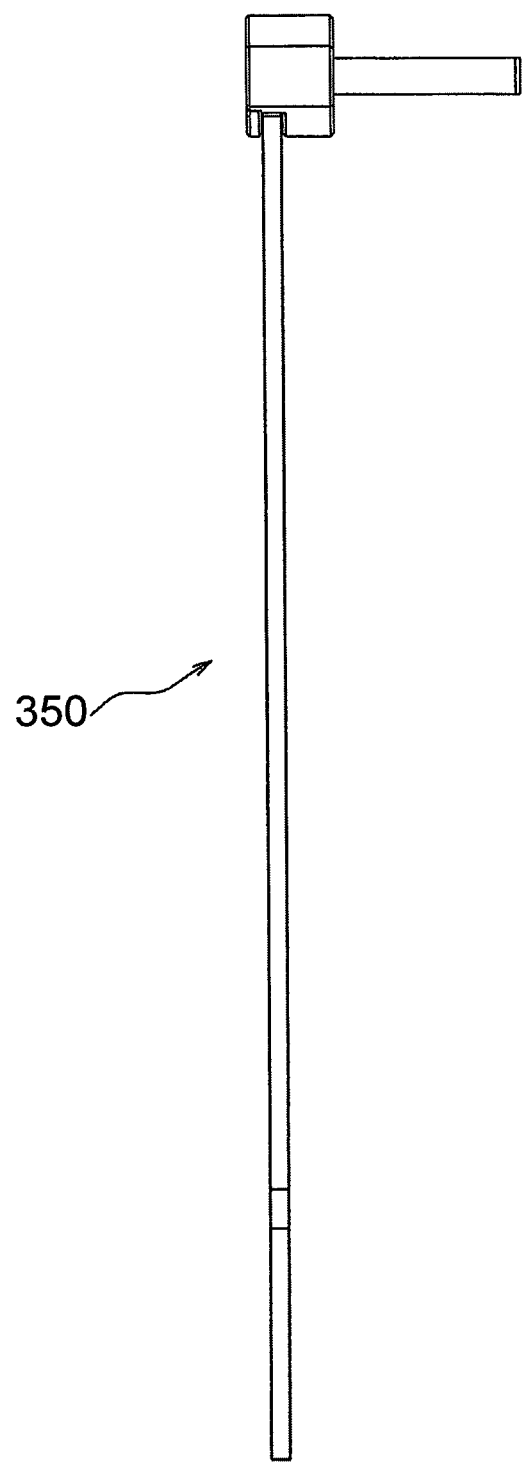
FIG. 33 is a left side view of the optical fiber unit according to the first modification of the second embodiment.
Figure 34:
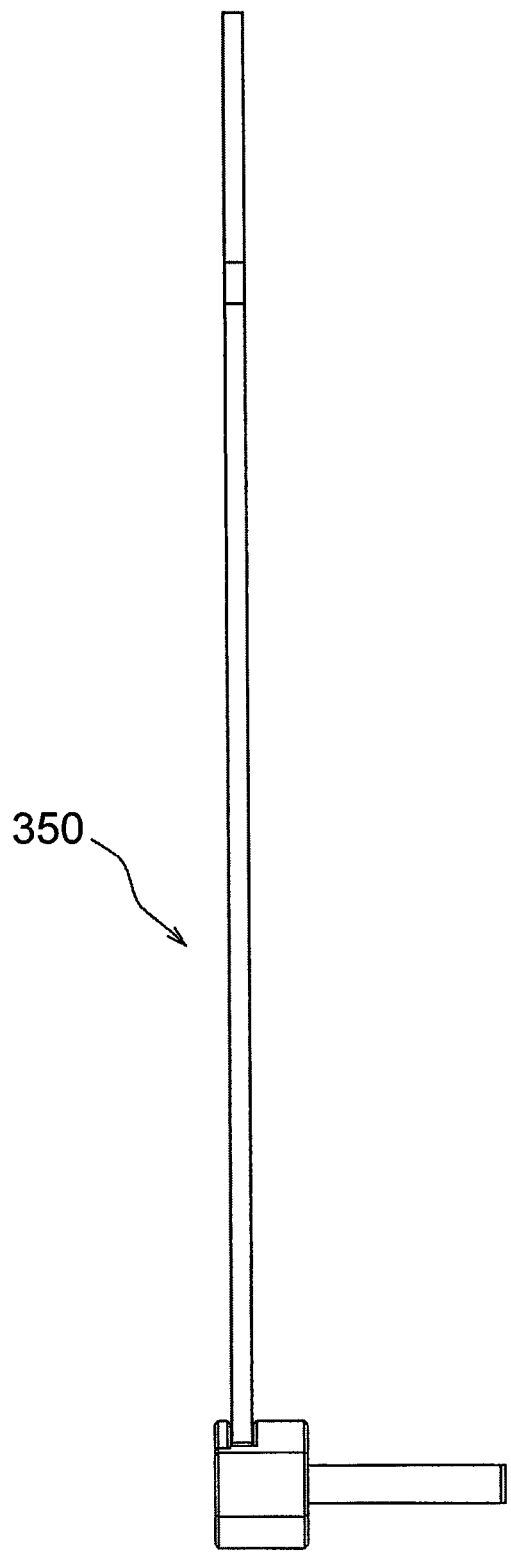
FIG. 34 is a right side view of the optical fiber unit according to the first modification of the second embodiment.
Figure 35:
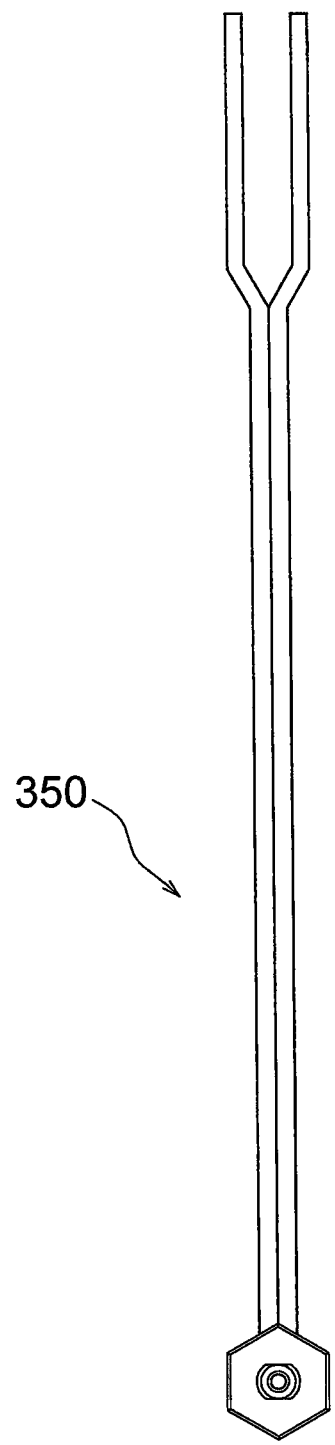
FIG. 35 is a plan view of the optical fiber unit according to the first modification of the second embodiment.
Figure 36:
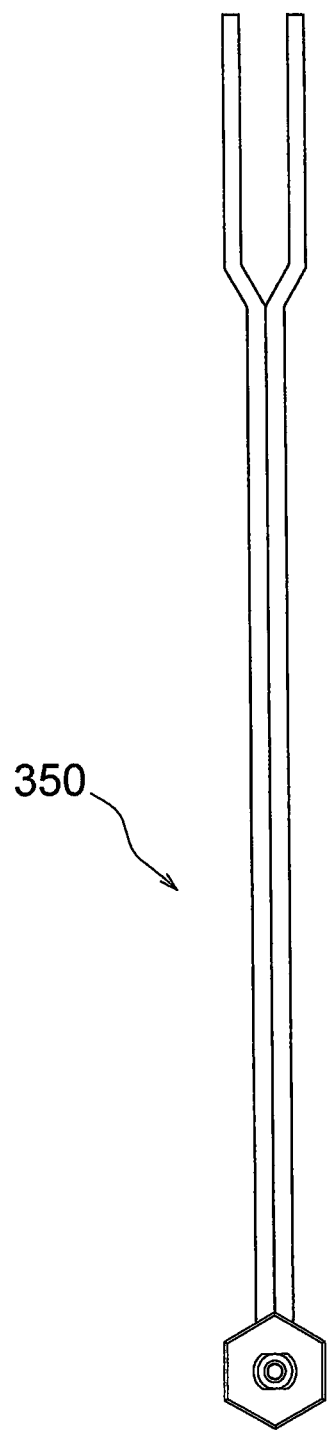
FIG. 36 is a bottom view of the optical fiber unit according to the first modification of the second embodiment.

FIG. 29 is a perspective view showing the appearance of the coaxial reflective optical fiber unit 350. FIG. 30 is an exploded perspective view of the optical fiber unit 350. FIG. 31 is a front view of the optical fiber unit 350. FIG. 32 is a back view of the optical fiber unit 350. FIG. 33 is a left side view of the optical fiber unit 350. FIG. 34 is a right side view of the optical fiber unit 350. FIG. 35 is a plan view of the optical fiber unit 350. FIG. 36 is a bottom view of the optical fiber unit 350.

The distal end of each of the optical fiber cables 57*a* and 57*b* of the coaxial reflective optical fiber unit 350 is uncovered by removing the coating material, and thus the optical fiber 70 is exposed. The optical fiber 70 includes an optical fiber for projecting light and an optical fiber for receiving light that are integrated together. In one example, the optical fiber 70 may include the optical fiber for projecting light arranged at the center, which is surrounded by the optical fiber for receiving light.

The optical fiber 70 uncovered by removing the coating material is inserted in the through-hole 65 of the shaft 54. The shaft 54 has a smaller diameter than the shaft 54 of the optical fiber unit 250 described in the second example. The portion of the through-hole 65 for receiving the distal ends of the optical fiber cables 57*a* and 57*b* coated with the coating material is sized in conformance with the optical fiber cables 57*a* and 57*b*. The optical fiber 70 of the optical fiber unit 350 is inserted through the through-hole 65. Thus, the optical fiber unit 350 eliminates the lens member 55, which is included in the reflective optical fiber unit 250 of the second example.

The optical fiber unit 350 with the above structure includes a first opening portion 69*a* formed in a first side 64*a* and a second opening portion 69*b* formed in a second side 64*b* in the same manner as the optical fiber unit 250 according to the second example. Thus, the optical fiber cables 57*a* and 57*b* are movable in a wide range in the planar direction in accordance with the size of the opening 69, in the same manner as in the optical fiber unit 250 of the second example. This structure thus improves the degree of freedom in setting the jig 80.

5-2. Diffusive-reflective Optical Fiber Unit 450

A diffusive-reflective optical fiber unit 450 according to a second modification will now be described.

The diffusive-reflective optical fiber unit 450 according to a second modification of the second example differs from the reflective optical fiber unit 250 according to the second example in the components described below. The other components that are the same as in the first modification will not be described.

Figure 37:
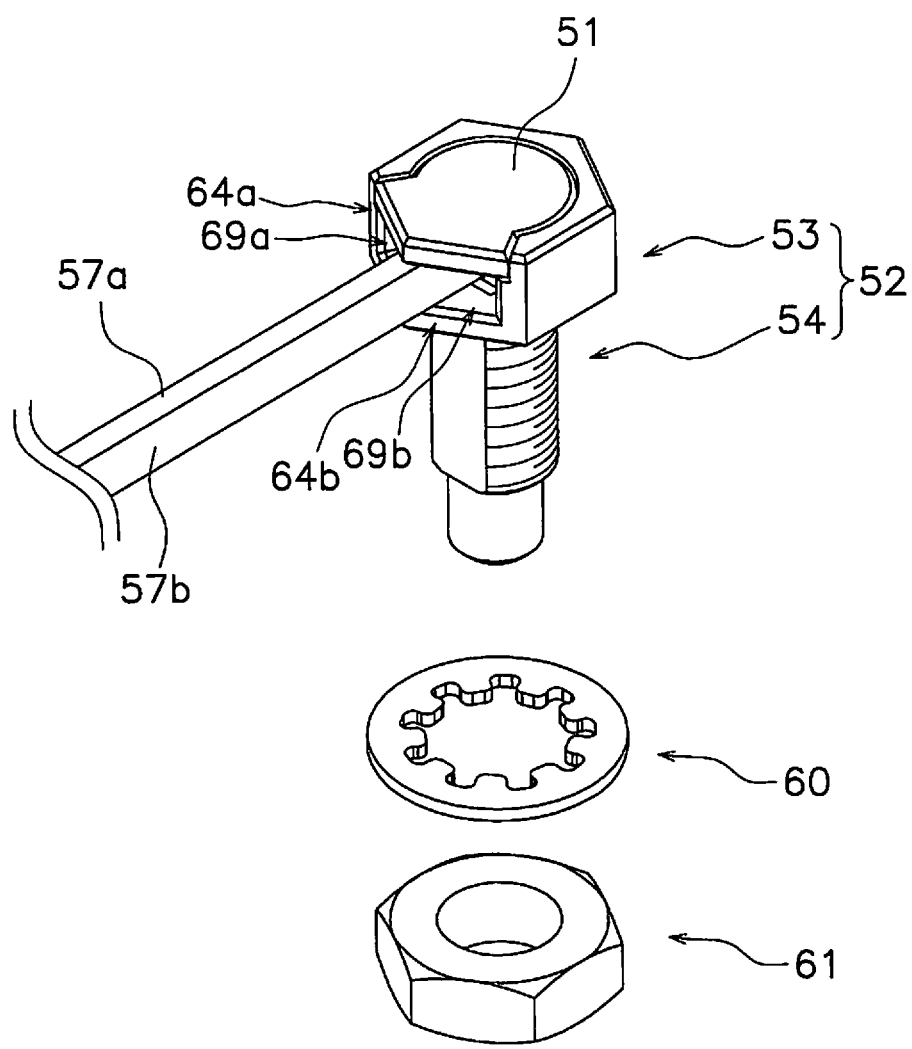
FIG. 37 is a perspective view showing the appearance of a diffusive-reflective optical fiber unit according to a second modification of the second embodiment.
Figure 38:
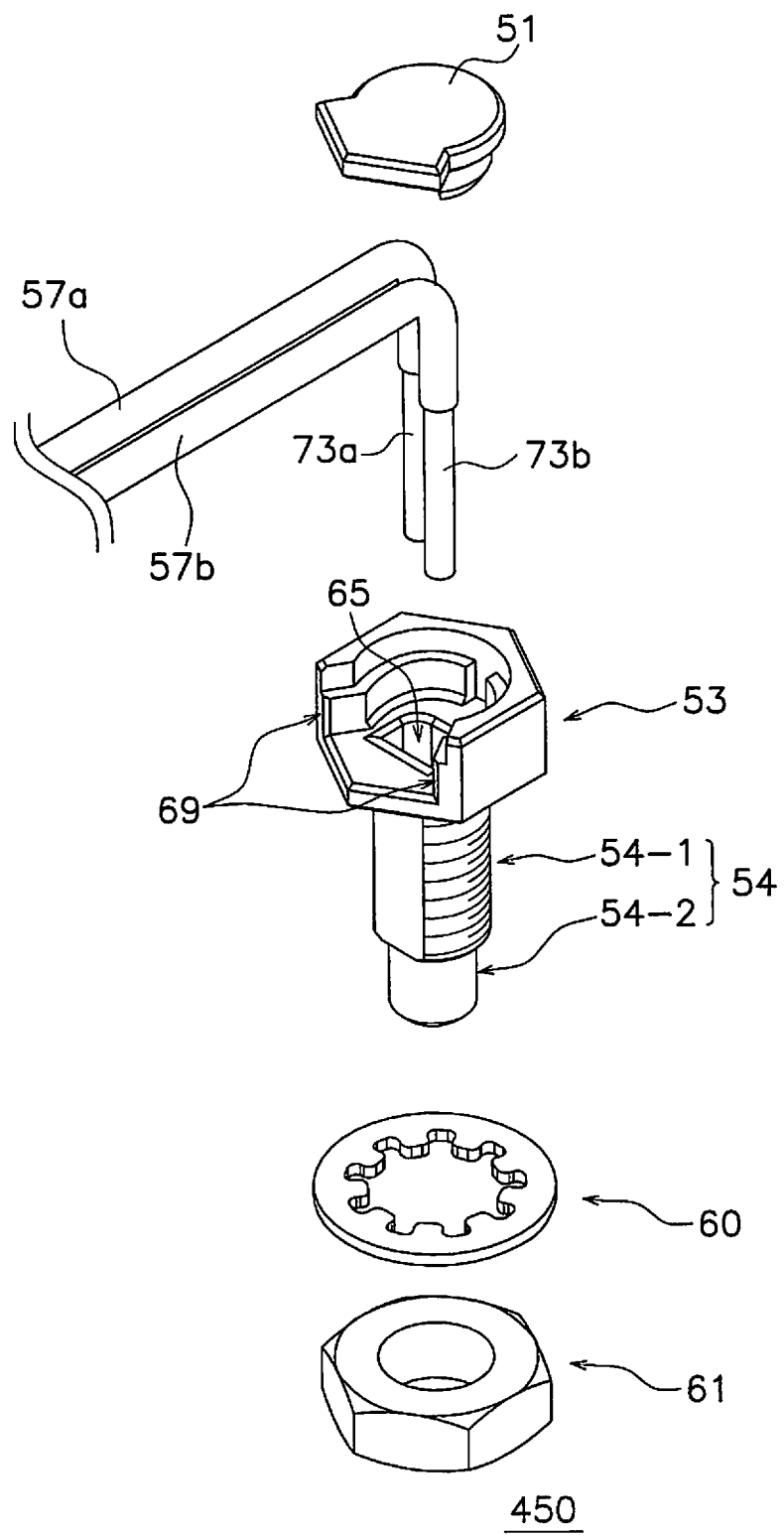
FIG. 38 is an exploded perspective view of the diffusive-reflective optical fiber unit according to the second modification of the second embodiment.
Figure 39:
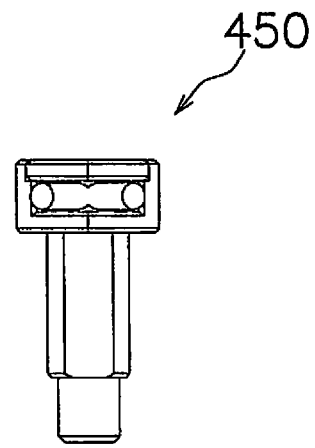
FIG. 39 is a front view of the optical fiber unit according to the second modification of the second embodiment.
Figure 40:
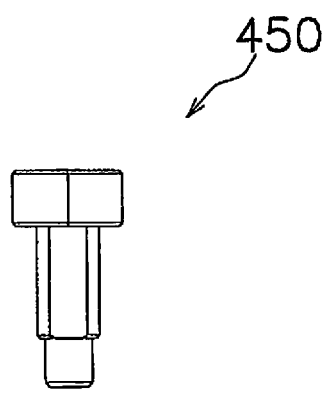
FIG. 40 is a back view of the optical fiber unit according to the second modification of the second embodiment.
Figure 41:
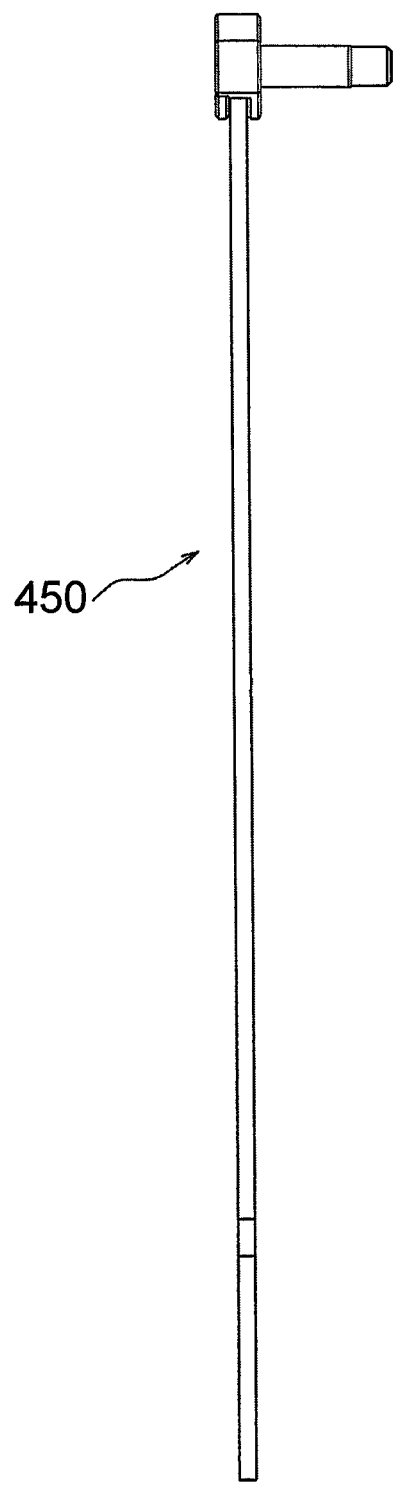
FIG. 41 is a left side view of the optical fiber unit according to the second modification of the second embodiment.
Figure 42:
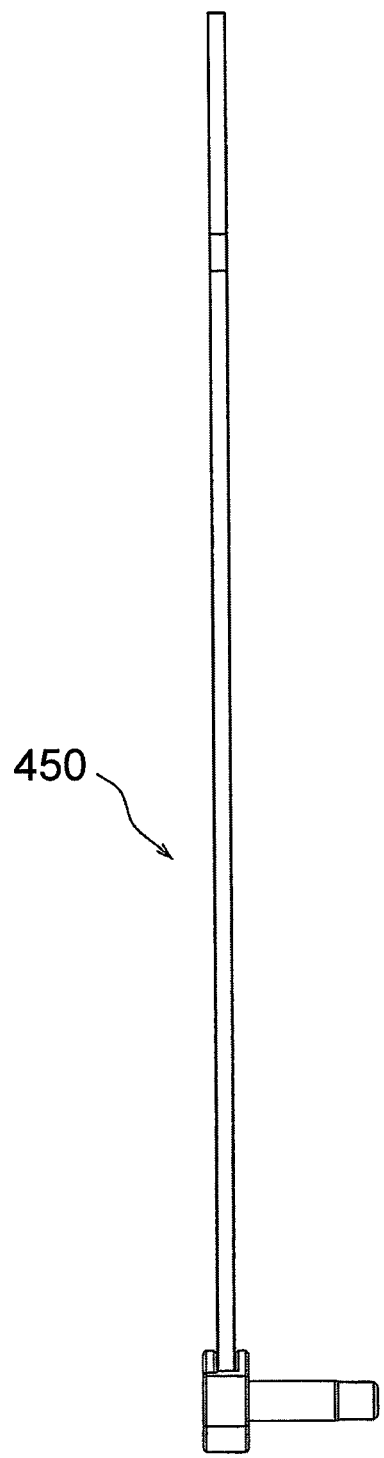
FIG. 42 is a right side view of the optical fiber unit according to the second modification of the second embodiment.
Figure 43:
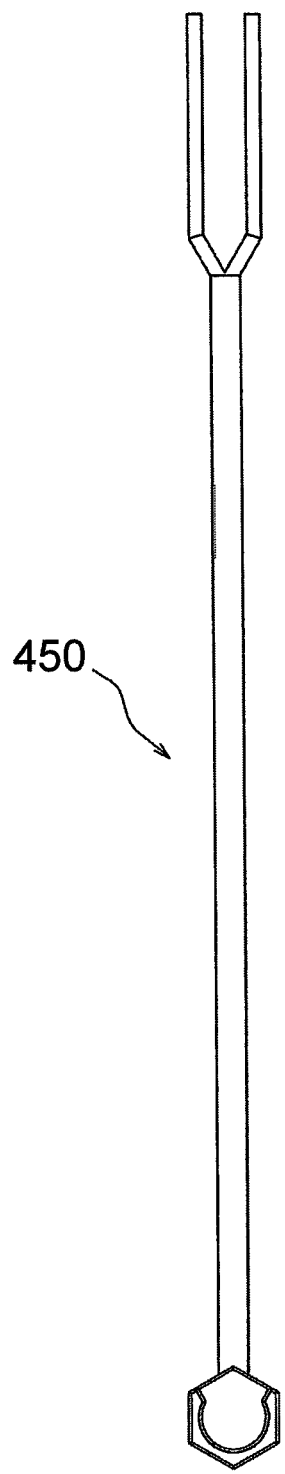
FIG. 43 is a plan view of the optical fiber unit according to the second modification of the second embodiment.
Figure 44:
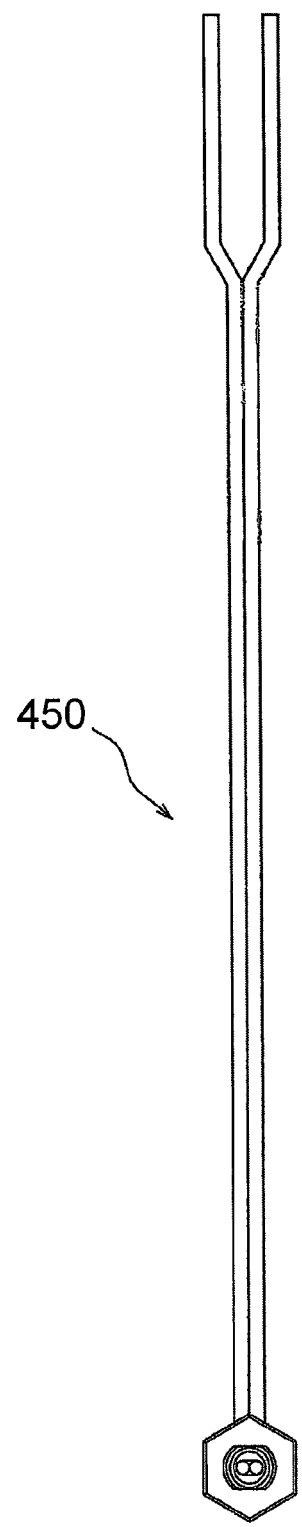
FIG. 44 is a bottom view of the optical fiber unit according to the second modification of the second embodiment.

FIG. 37 is a perspective view showing the appearance of the diffusive-reflective optical fiber unit 450. FIG. 38 is an exploded perspective view of the optical fiber unit 450. FIG. 39 is a front view of the optical fiber unit 450. FIG. 40 is a back view of the optical fiber unit 450. FIG. 41 is a left side view of the optical fiber unit 450. FIG. 42 is a right side view of the optical fiber unit 450. FIG. 43 is a plan view of the optical fiber unit 450. FIG. 44 is a bottom view of the optical fiber unit 450.

The distal end of each of the optical fiber cables 57*a* and 57*b* in the diffusive-reflective optical fiber unit 450 is uncovered by removing the coating material, and thus optical fibers 73*a* and 73*b* are exposed. The optical fiber 73*a* extends from the optical fiber cable 57*a*. The optical fiber 73*b* extends from the optical fiber cable 57*b*.

The optical fibers 73*a* and 73*b* uncovered by removing the coating material are inserted in the through-hole 65 of the shaft 54. The shaft 54 includes a first shaft 54-1 having a larger diameter and a second shaft 54-2 having a smaller diameter. The optical fiber unit 450 accommodates the optical fibers 73*a* and 73*b* of the optical fiber unit 450 inserted through the through-hole 65. Thus, the reflective optical fiber unit 450 eliminates the lens member 55, which is included in the reflective optical fiber unit 250 according to the second example.

The optical fiber unit 450 with the above structure includes a first opening portion 69*a* formed in a first side 64*a* and a second opening portion 69*b* formed in a second side 64*b* in the same manner as the optical fiber unit 250 in the second example. Thus, the optical fiber cables 57*a* and 57*b* are movable in a wide range in the planar direction in accordance with the size of the opening 69, in the same manner as in the optical fiber unit 250 of the second example. This structure thus improves the degree of freedom in setting the jig 80.

Other Modifications

The above embodiments desirably may be further modified in the following representative forms.

(a) In the above examples, the head 53 is shaped in a hexagonal prism. The outer shape of the head 53 should not be limited to this shape. The head 53 may have another polygonal outer shape, such as a rectangular prism or an octagonal prism.

(b) In the modification of the first example, the opening 69 is formed in at least the first side 64*a*, the second side 64*b*, and the third side 64*c* of the head 53, which are adjacent to each other. More specifically, the opening 69 includes the first opening portion 69*a* formed in the first side 64*a*, the second opening portion 69*b* formed in the second side 64*b*, and the third opening 69*c* formed in the third side, which are adjacent to each other. The structure including the opening formed across three or more adjacent sides is also applicable to the structure of the second example.

(c) In each of the first and second examples, the optical fiber unit includes the cover 51. Alternatively, the optical fiber unit may eliminate the cover 51. The use of the cover 51 is preferable when the bent optical fiber cable 57 is to be accommodated in the space 68 of the head 53.

(d) In the above examples, the optical fiber cable is fixed to the shaft. Alternatively, the optical fiber cable may be fixed to a portion other than the shaft. For example, the optical fiber cable may be fixed to the head. In this case, it is preferable that the optical fiber cable is fixed at an extension of the through-hole. The optical fiber cable may be fixed without using adhesive.

Figure 45:
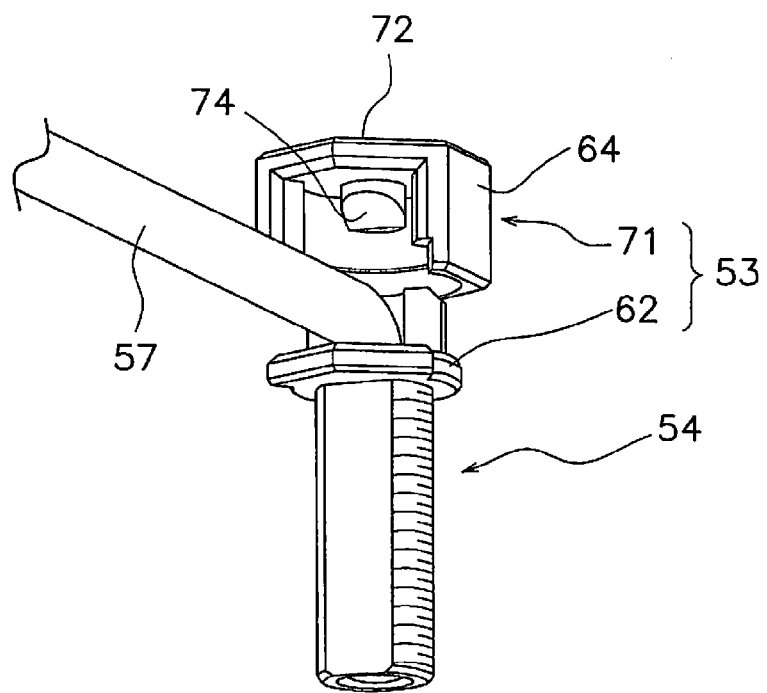
FIG. 45 is a perspective view of the fixing structure of the optical fiber cable according to the first modification.
Figure 46:
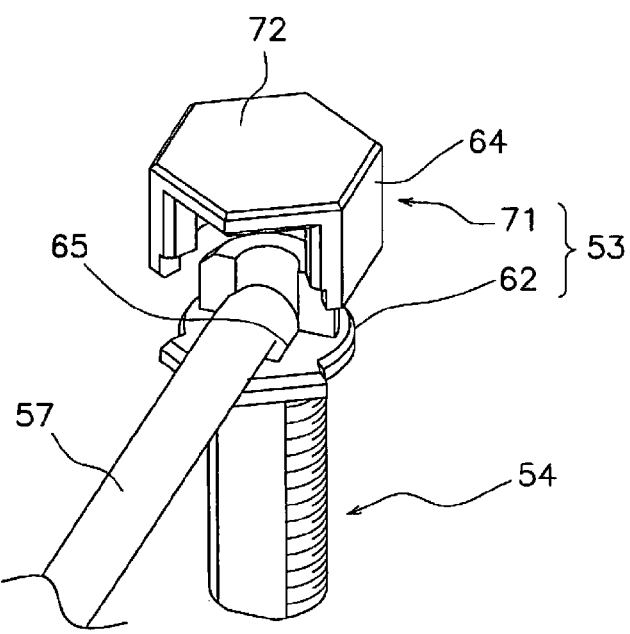
FIG. 46 is a perspective view of the fixing structure of the optical fiber cable according to the first modification.

For example, FIGS. 45 and 46 are perspective views showing the fixing structure of the optical fiber cable 57 according to a first modification. As shown in FIGS. 45 and 46, the head 53 includes a bottom 62 and a head body 71. The head body 71, which is separate from the bottom 62, includes an outer wall 64, an upper portion 72, and a protrusion 74. The protrusion 74 protrudes downward from the upper portion 72. When the head body 71 is attached to the bottom 62, the protrusion 74 is located above the through-hole 65. More specifically, the protrusion 74 is located at an extension of the through-hole 65. When the head body 71 is attached to the bottom 62, the protrusion 74 presses the optical fiber cable 57. This fixes the optical fiber cable 57.

Figure 47:
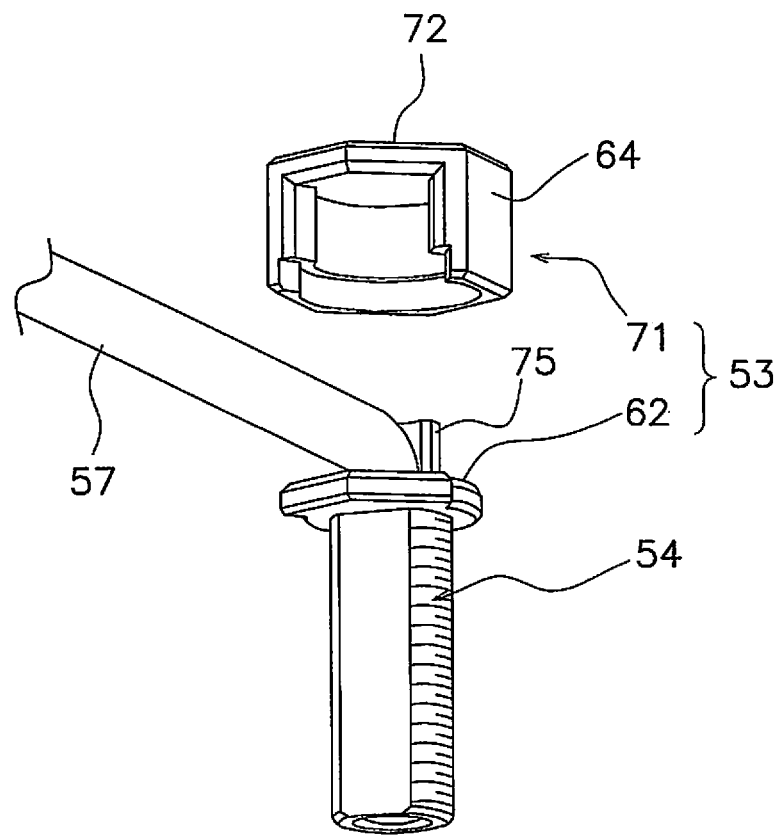
FIG. 47 is a perspective view of the fixing structure of the optical fiber cable according to the second modification.
Figure 48:
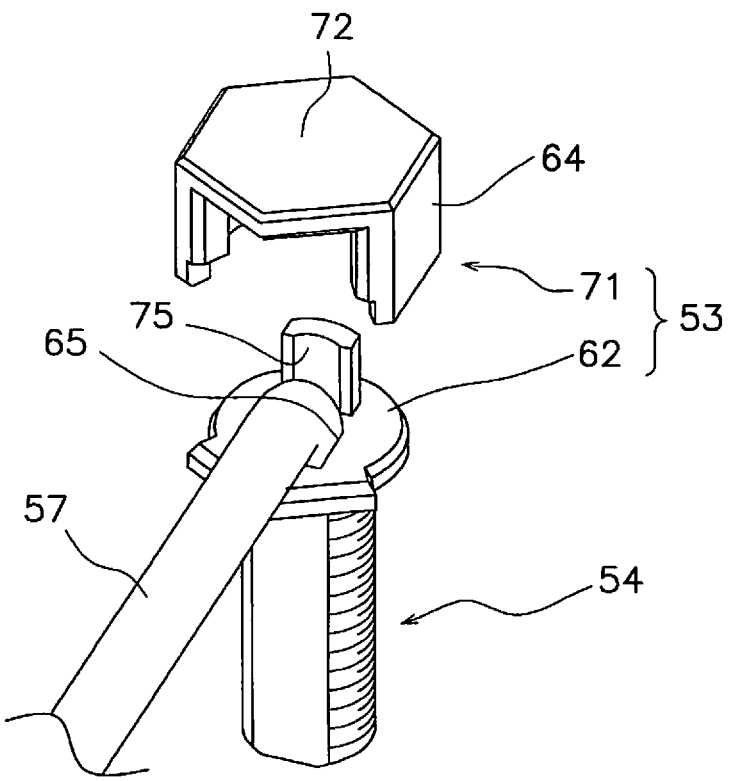
FIG. 48 is a perspective view of the fixing structure of the optical fiber cable according to the second modification.
Figure 49:
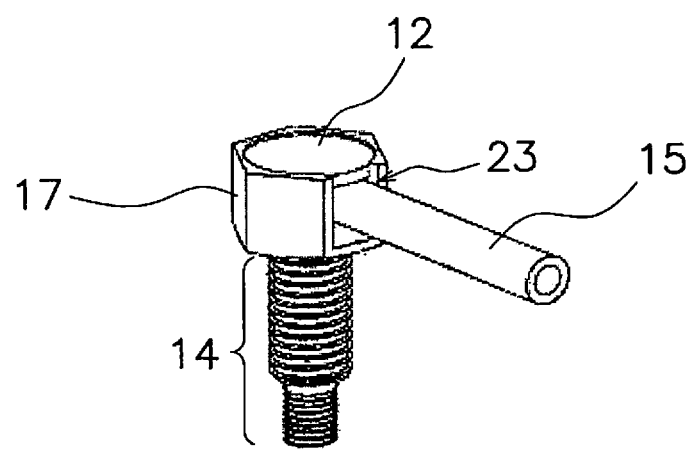
FIG. 49 is a perspective view of an optical fiber unit according to a conventional technique.
Figure 50:
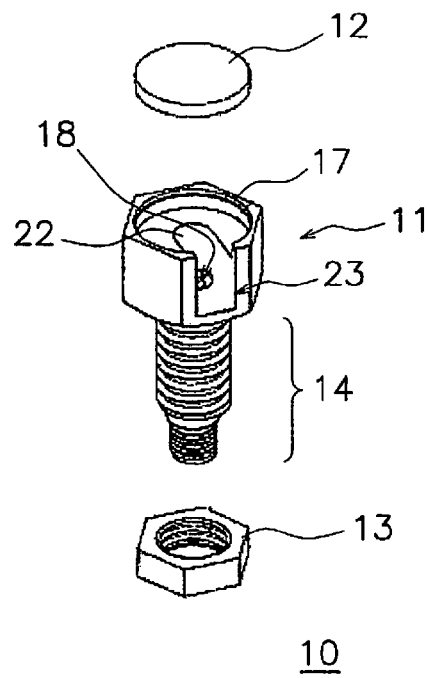
FIG. 50 is an exploded perspective view of the optical fiber unit according to the conventional technique.
Figure 51A:
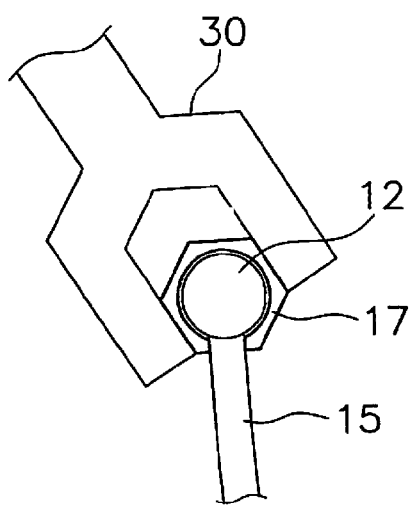
FIGS. 51A and 51B are diagrams each describing a method of setting a jig on the optical fiber unit according to the conventional technique.
Figure 51B:
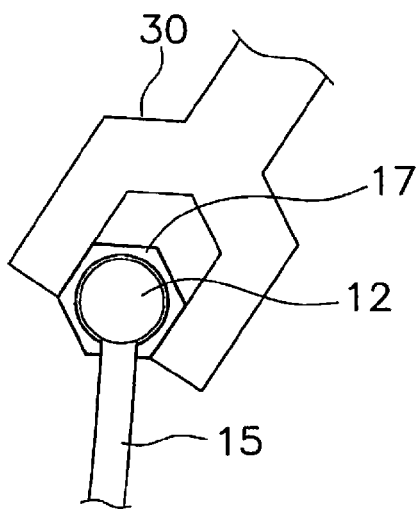

FIGS. 47 and 48 are perspective views showing the fixing structure of the optical fiber cable 57 according to a second modification. As shown in FIGS. 47 and 48, the head 53 includes a bottom 62 and a head body 71. The head body 71, which is separate from the bottom 62, includes an outer wall 64 and an upper portion 72. The bottom 62 includes a protrusion 75. The protrusion 75 protrudes upward from the bottom 62, and is adjacent to the through-hole 65. The protrusion 75 is inclined toward the optical fiber cable 57, and then the protrusion 75 presses the optical fiber cable 57. This fixes the optical fiber cable 57.

INDUSTRIAL APPLICABILITY

The present invention improves the degree of freedom in setting a jig on an optical fiber unit, and thus is applicable to various types of optical fiber sensors incorporating an optical fiber unit.

The invention claimed is:

1. An optical fiber unit for an optical fiber sensor, the optical fiber unit comprising:
   an optical fiber cable;
   a shaft including a peripheral surface having a male thread, and a through-hole in which the optical fiber cable is inserted; and
   a head shaped as a polygonal prism including a plurality of sides and a bottom connected to the shaft, the plurality of sides including a first side and a second side adjacent to each other, the head includes a space that communicates with the through-hole, the space exposed at an opening formed in at least the first side and the second side among the plurality of sides, the opening including a first opening portion formed in the first side and a second opening portion formed in the second side, the first opening portion and the second opening portion communicating with each other to allow the optical fiber cable free movement across the two openings, wherein
   the optical fiber cable is positioned through the space and extends from the opening.

2. The optical fiber unit for an optical fiber sensor according to claim 1, wherein
   the opening has a width greater than a width of the first side and greater than a width of the second side.

3. The optical fiber unit for an optical fiber sensor according to claim 1, wherein
   the first opening portion has a width equal to or greater than a width of the optical fiber cable.

4. The optical fiber unit for an optical fiber sensor according to claim 1, wherein
   the second opening portion has a width equal to or greater than a width of the optical fiber cable.

5. The optical fiber unit for an optical fiber sensor according to claim 1, wherein
   the optical fiber cable is positioned within the space and remains movable.

6. The optical fiber unit for an optical fiber sensor according to claim 1, wherein
   the optical fiber cable is non-movably fixed within the through-hole or at an extension of the through-hole.

7. The optical fiber unit for an optical fiber sensor according to claim 1, further comprising:
   a cover attached to the head to cover the space in a direction of a central axis of the through-hole,
   wherein the cover includes a first side that is flush with the first side of the head, and a second side that is flush with the second side of the head.

8. The optical fiber unit for an optical fiber sensor according to claim 1, wherein
   the space has a width that is greater at a location that is further from the through-hole.

9. The optical fiber unit for an optical fiber sensor according to claim 1, wherein
   the communicating portion between the through-hole and the space is tapered.

* * * * *